(12) United States Patent
Jung et al.

(10) Patent No.: US 10,907,887 B2
(45) Date of Patent: Feb. 2, 2021

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Sungsub Lee, Seoul (KR); Daewoong Kim, Seoul (KR); Sora Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 15/749,161

(22) PCT Filed: Aug. 2, 2016

(86) PCT No.: PCT/KR2016/008512
§ 371 (c)(1),
(2) Date: Jan. 31, 2018

(87) PCT Pub. No.: WO2017/023094
PCT Pub. Date: Feb. 9, 2017

(65) Prior Publication Data
US 2018/0224197 A1    Aug. 9, 2018

(30) Foreign Application Priority Data

Aug. 3, 2015 (KR) .................... 10-2015-0109622
Aug. 3, 2015 (KR) .................... 10-2015-0109626
Aug. 3, 2015 (KR) .................... 10-2015-0109721

(51) Int. Cl.
*F25D 23/06* (2006.01)
*F16L 59/065* (2006.01)
(Continued)

(52) U.S. Cl.
CPC .......... *F25D 23/063* (2013.01); *F16L 59/065* (2013.01); *F25D 19/006* (2013.01);
(Continued)

(58) Field of Classification Search
CPC .......... F25D 23/06; F25D 23/062–064; F25D 23/082; F25D 23/028; F25D 23/87;
(Continued)

(56) References Cited

U.S. PATENT DOCUMENTS 1,413,169 A    4/1922 Lawton
1,588,707 A    6/1926 Csiga
(Continued)

FOREIGN PATENT DOCUMENTS

CN    1132346    10/1996
CN    1191959    9/1998
(Continued)

OTHER PUBLICATIONS

European Search Report dated Feb. 20, 2019 issued in EP Application No. 16833313.6.
(Continued)

*Primary Examiner* — Joseph F Trpisovsky
(74) *Attorney, Agent, or Firm* — KED & Associates LLP

(57) ABSTRACT

A vacuum adiabatic body includes a first plate; a second plate; a seal; a support; and an exhaust port, wherein an extension tab extending toward the third space to be coupled to the support is provided to at least one of the first and second plates, and the extension tab extends downward from an edge portion of the at least one of the first and second plates.

10 Claims, 13 Drawing Sheets

(51) Int. Cl.
*F25D 19/00* (2006.01)
*F25D 23/08* (2006.01)
*F25D 23/02* (2006.01)

(52) U.S. Cl.
CPC ........... *F25D 23/06* (2013.01); *F25D 23/064* (2013.01); *F25D 23/082* (2013.01); *F25D 23/028* (2013.01); *F25D 2201/14* (2013.01)

(58) Field of Classification Search
CPC .. F25D 19/006; F25D 2201/14; F16L 59/065; Y10T 428/231
See application file for complete search history.

(56) References Cited

U.S. PATENT DOCUMENTS

| | | | |
|---|---|---|---|
| 1,845,353 | A | 2/1932 | Snell |
| 2,000,882 | A | 5/1935 | Comstock |
| 2,708,774 | A | 5/1955 | Seelen |
| 2,715,976 | A | 8/1955 | Whitmore |
| 2,729,863 | A | 1/1956 | Kurtz |
| 2,768,046 | A | 10/1956 | Evans |
| 2,786,241 | A | 3/1957 | Garvey et al. |
| 3,091,946 | A | 6/1963 | Kesling |
| 3,161,265 | A | 12/1964 | Matsch et al. |
| 3,289,423 | A | 12/1966 | Berner et al. |
| 3,370,740 | A | 2/1968 | Anderson |
| 4,056,211 | A | 11/1977 | Zumwalt |
| 4,646,934 | A | 3/1987 | McAllister |
| 4,822,117 | A | 4/1989 | Boston, Jr. |
| 4,959,111 | A | 9/1990 | Kruck et al. |
| 5,011,729 | A | 4/1991 | McAllister |
| 5,018,328 | A | 5/1991 | Cur |
| 5,185,981 | A | 2/1993 | Martinez |
| 5,512,345 | A | 4/1996 | Tsutsumi et al. |
| 5,532,034 | A | 7/1996 | Kirby et al. |
| 5,795,639 | A | 8/1998 | Lin |
| 5,947,479 | A | 9/1999 | Ostrowski |
| 6,038,830 | A | 3/2000 | Hirath et al. |
| 6,192,703 | B1 | 2/2001 | Salyer et al. |
| 6,244,458 | B1 | 6/2001 | Frysinger et al. |
| 6,338,536 | B1 | 1/2002 | Ueno et al. |
| 6,485,122 | B2 | 11/2002 | Wolf |
| 8,857,931 | B2 | 10/2014 | Jung et al. |
| 8,943,770 | B2 | 2/2015 | Sanders |
| 8,944,541 | B2 | 2/2015 | Allard et al. |
| 9,441,779 | B1 | 9/2016 | Alshourbagy et al. |
| 9,463,918 | B2 | 10/2016 | Reid |
| 2002/0041134 | A1 | 4/2002 | Wolf et al. |
| 2002/0100250 | A1 | 8/2002 | Hirath et al. |
| 2002/0170265 | A1 | 11/2002 | Tokonabe et al. |
| 2003/0115838 | A1 | 6/2003 | Rouanet et al. |
| 2004/0051427 | A1 | 3/2004 | Cittadini et al. |
| 2004/0226956 | A1 | 11/2004 | Brooks |
| 2005/0175809 | A1 | 8/2005 | Hirai et al. |
| 2005/0235682 | A1 | 10/2005 | Hirai et al. |
| 2007/0152551 | A1 | 7/2007 | Kim et al. |
| 2007/0243358 | A1 | 10/2007 | Gandini |
| 2008/0110128 | A1 | 5/2008 | Hirath |
| 2008/0289898 | A1 | 11/2008 | Rickards |
| 2009/0113899 | A1 | 5/2009 | Dain et al. |
| 2010/0104923 | A1 | 4/2010 | Takeguchi et al. |
| 2011/0089802 | A1 | 4/2011 | Cording |
| 2012/0104923 | A1 | 5/2012 | Jung et al. |
| 2012/0125039 | A1 | 5/2012 | Hwang |
| 2012/0128920 | A1 | 5/2012 | Yoon et al. |
| 2013/0099650 | A1 | 4/2013 | Lee et al. |
| 2013/0105494 | A1 | 5/2013 | Jung |
| 2013/0105496 | A1 | 5/2013 | Jung |
| 2013/0255304 | A1 | 10/2013 | Cur et al. |
| 2013/0257257 | A1 | 10/2013 | Cur |
| 2013/0293080 | A1 | 11/2013 | Kim |
| 2014/0216100 | A1 | 8/2014 | Toshimitsu et al. |
| 2014/0346942 | A1 | 11/2014 | Kim et al. |
| 2015/0030800 | A1 | 1/2015 | Jung et al. |
| 2015/0192356 | A1 | 7/2015 | Kang et al. |
| 2017/0325634 | A1 | 11/2017 | Cai et al. |
| 2018/0266620 | A1 | 9/2018 | Kawarazaki et al. |
| 2018/0299060 | A1 | 10/2018 | Song et al. |
| 2018/0313492 | A1 | 11/2018 | Kitano et al. |

FOREIGN PATENT DOCUMENTS

| | | |
|---|---|---|
| CN | 1286386 | 3/2001 |
| CN | 1515857 | 7/2004 |
| CN | 2700790 | 5/2005 |
| CN | 1820173 | 8/2006 |
| CN | 1896657 | 1/2007 |
| CN | 101072968 | 11/2007 |
| CN | 101171472 | 4/2008 |
| CN | 201764779 | 3/2011 |
| CN | 201811526 | 4/2011 |
| CN | 102261470 | 11/2011 |
| CN | 102455103 | 5/2012 |
| CN | 102455105 | 5/2012 |
| CN | 102818421 | 12/2012 |
| CN | 102927740 | 2/2013 |
| CN | 103090616 | 5/2013 |
| CN | 103189696 | 7/2013 |
| CN | 203095854 | 7/2013 |
| CN | 103542660 | 1/2014 |
| CN | 103575038 | 2/2014 |
| CN | 103649658 | 3/2014 |
| CN | 104180595 | 12/2014 |
| CN | 104204646 | 12/2014 |
| CN | 104254749 | 12/2014 |
| CN | 104344653 | 2/2015 |
| CN | 104482707 | 4/2015 |
| CN | 104567215 | 4/2015 |
| CN | 104634047 | 5/2015 |
| CN | 104746690 | 7/2015 |
| DE | 956 899 | 1/1957 |
| DE | 28 02 910 | 8/1978 |
| DE | 31 21 351 | 12/1982 |
| DE | 9204365 | 7/1992 |
| DE | 197 45 825 | 4/1999 |
| DE | 299 12 917 | 11/1999 |
| DE | 199 07 182 | 8/2000 |
| DE | 10 2011 014 302 | 9/2012 |
| DE | 10 2011 079 209 | 1/2013 |
| EP | 0658733 | 6/1995 |
| EP | 0 892 120 | 1/1999 |
| EP | 1 477 752 | 11/2004 |
| EP | 1 484 563 | 12/2004 |
| EP | 1 614 954 | 1/2006 |
| EP | 2 333 179 | 6/2011 |
| EP | 2 447 639 | 5/2012 |
| EP | 2 806 239 | 11/2014 |
| EP | 2 829 827 | 1/2015 |
| EP | 2 952 839 | 12/2015 |
| GB | 890372 | 2/1962 |
| GB | 2 446 053 | 7/2008 |
| JP | 11-211334 | 8/1999 |
| JP | 2003-106760 | 4/2003 |
| JP | 2003-269688 | 9/2003 |
| JP | 2004-044980 | 2/2004 |
| JP | 2005-214372 A | 8/2005 |
| JP | 2007-218509 | 8/2007 |
| JP | 2012-255607 | 12/2012 |
| JP | 2014-037931 | 2/2014 |
| KR | 10-0343719 | 7/2002 |
| KR | 10-2005-0065088 | 6/2005 |
| KR | 10-2010-0099629 | 9/2010 |
| KR | 10-2011-0015327 | 2/2011 |
| KR | 10-1041086 | 6/2011 |
| KR | 10-2012-0044558 A | 5/2012 |
| KR | 10-2012-0139648 | 12/2012 |
| KR | 10-2013-0048530 A | 5/2013 |
| KR | 10-2015-0012712 | 2/2015 |
| KR | 10-1506413 | 3/2015 |
| NL | 1005962 | 11/1998 |
| RU | 129188 | 6/2013 |

(56) References Cited

FOREIGN PATENT DOCUMENTS

| WO | WO 2006/003199 | 1/2006 |
|---|---|---|
| WO | WO 2012/084874 | 6/2012 |
| WO | WO 2014/175639 | 10/2014 |

OTHER PUBLICATIONS

U.S. Office Action dated Jun. 13, 2019 issued in related U.S. Appl. No. 15/749,139.
U.S. Office Action dated Jun. 13, 2019 issued in related U.S. Appl. No. 15/749,142.
U.S. Office Action dated Jun. 13, 2019 issued in related U.S. Appl. No. 15/749,136.
U.S. Office Action dated Oct. 17, 2019 issued in U.S. Appl. No. 15/749,147.
U.S. Office Action dated Oct. 17, 2019 issued in U.S. Appl. No. 15/749,143.
U.S. Office Action dated Oct. 17, 2019 issued in U.S. Appl. No. 15/749,162.
United States Office Action dated Feb. 18, 2020 issued in U.S. Appl. No. 15/749,146.
European Search Report dated Feb. 22, 2019 issued in EP Application No. 16833312.8.
European Search Report dated Feb. 26, 2019 issued in EP Application No. 16833324.3.
European Search Report dated Feb. 26, 2019 issued in EP Application No. 16833336.7.
European Search Report dated Mar. 1, 2019 issued in EP Application No. 16833323.5.
European Search Report dated Mar. 1, 2019 issued in EP Application No. 16833338.3.
European Search Report dated Mar. 13, 2019 issued in EP Application No. 16833331.8.
European Search Report dated Mar. 15, 2019 issued in EP Application No. 16833326.8.
European Search Report dated Apr. 3, 2019 issued in EP Application No. 16833325.0.
International Search Report and Written Opinion dated Oct. 12, 2016 issued in Application No. PCT/KR2016/008465.
International Search Report and Written Opinion dated Oct. 12, 2016 issued in Application No. PCT/KR2016/008507.
International Search Report and Written Opinion dated Nov. 21, 2016 issued in Application No. PCT/KR2016/008466.
International Search Report and Written Opinion dated Nov. 21, 2016 issued in Application No. PCT/KR2016/008468.
International Search Report and Written Opinion dated Nov. 21, 2016 issued in Application No. PCT/KR2016/008469.
International Search Report and Written Opinion dated Nov. 21, 2016 issued in Application No. PCT/KR2016/008470.
International Search Report and Written Opinion dated Nov. 21, 2016 issued in Application No. PCT/KR2016/008501.
International Search Report and Written Opinion dated Nov. 21, 2016 issued in Application No. PCT/KR2016/008502.
International Search Report and Written Opinion dated Nov. 21, 2016 issued in Application No. PCT/KR2016/008505.
International Search Report and Written Opinion dated Nov. 21, 2016 issued in Application No. PCT/KR2016/008519.
International Search Report and Written Opinion dated Nov. 21, 2016 issued in Application No. PCT/KR2016/008523.
International Search Report and Written Opinion dated Dec. 7, 2016 issued in Application No. PCT/KR2016/008516.
International Search Report and Written Opinion dated Dec. 23, 2016 issued in Application No. PCT/KR2016/008512.
International Search Report and Written Opinion dated Dec. 23, 2016 issued in Application No. PCT/KR2016/008514.
United States Office Action dated Apr. 15, 2020 issued in U.S. Appl. No. 15/749,136.
United States Notice of Allowance dated Apr. 15, 2020 issued in U.S. Appl. No. 15/749,140.
United States Office Action dated Mar. 27, 2020 issued in U.S. Appl. No. 15/749,149.
U.S. Office Action dated Oct. 4, 2019 issued in related U.S. Appl. No. 15/749,140.
European Search Report dated Feb. 13, 2019 issued in EP Application No. 16833309.4.
European Search Report dated Feb. 13, 2019 issued in EP Application No. 16833311.0.
United States Office Action dated Sep. 20, 2019 issued in U.S. Appl. No. 15/749,149.
Chinese Office Action (with English translation) dated Jul. 15, 2019 issued in CN Application No. 201680045949.0.
Chinese Office Action (with English translation) dated Aug. 5, 2019 issued in CN Application No. 201680045869.5.
Chinese Office Action (with English translation) dated Aug. 5, 2019 issued in CN Application No. 201680045899.6.
Chinese Office Action (with English translation) dated Aug. 5, 2019 issued in CN Application No. 201680045908.1.
Chinese Office Action (with English translation) dated Aug. 5, 2019 issued in CN Application No. 201680045935.9.
Chinese Office Action (with English translation) dated Aug. 5, 2019 issued in CN Application No. 201680046042.6.
Chinese Office Action (with English translation) dated Aug. 5, 2019 issued in CN Application No. 201680046048.3.
Chinese Office Action (with English translation) dated Aug. 13, 2019 issued in CN Application No. 201680045950.3.
Chinese Office Action (with English translation) dated Sep. 19, 2019 issued in CN Application No. 201680045897. 7.
Chinese Office Action (with English translation) dated Sep. 19, 2019 issued in CN Application No. 201680045898.1.
Chinese Office Action (with English translation) dated Sep. 19, 2019 issued in CN Application No. 201680046047.9.
United States Office Action dated Dec. 10, 2019 issued in U.S. Appl. No. 15/749,132.
Russian Office Action dated Sep. 25, 2018 issued in RU Application No. 2018107646.
European Search Report dated Dec. 21, 2018 issued in EP Application No. 16833330.0.
United States Office Action dated Mar. 20, 2020 issued in U.S. Appl. No. 15/749,162.
United States Office Action dated Mar. 24, 2020 issued in U.S. Appl. No. 15/749,154.
United States Office Action dated Mar. 25, 2020 issued in U.S. Appl. No. 15/749,156.
Korean Office Action dated Jun. 5, 2020 issued in Application 10-2017-0093784.
Extended European Search Report dated Jul. 10, 2020 issued in Application 20168389.3.
U.S. Office Action dated Sep. 1, 2020 issued in U.S. Appl. No. 15/749,156.
U.S. Appl. No. 15/749,132, filed Jan. 31, 2018.
U.S. Appl. No. 15/749,139, filed Jan. 31, 2018.
U.S. Appl. No. 15/749,136, filed Jan. 31, 2018.
U.S. Appl. No. 15/749,143, filed Jan. 31, 2018.
U.S. Appl. No. 15/749,146, filed Jan. 31, 2018.
U.S. Appl. No. 15/749,156, filed Jan. 31, 2018.
U.S. Appl. No. 15/749,162, filed Jan. 31, 2018.
U.S. Appl. No. 15/749,140, filed Jan. 31, 2018.
U.S. Appl. No. 15/749,147, filed Jan. 31, 2018.
U.S. Appl. No. 15/749,149, filed Jan. 31, 2018.
U.S. Appl. No. 15/749,179, filed Jan. 31, 2018.
U.S. Appl. No. 15/749,154, filed Jan. 31, 2018.
U.S. Appl. No. 15/749,161, filed Jan. 31, 2018.
U.S. Appl. No. 15/749,142, filed Jan. 31, 2018.
U.S. Appl. No. 16/710,720, filed Dec. 11, 2019.

[Fig. 1]
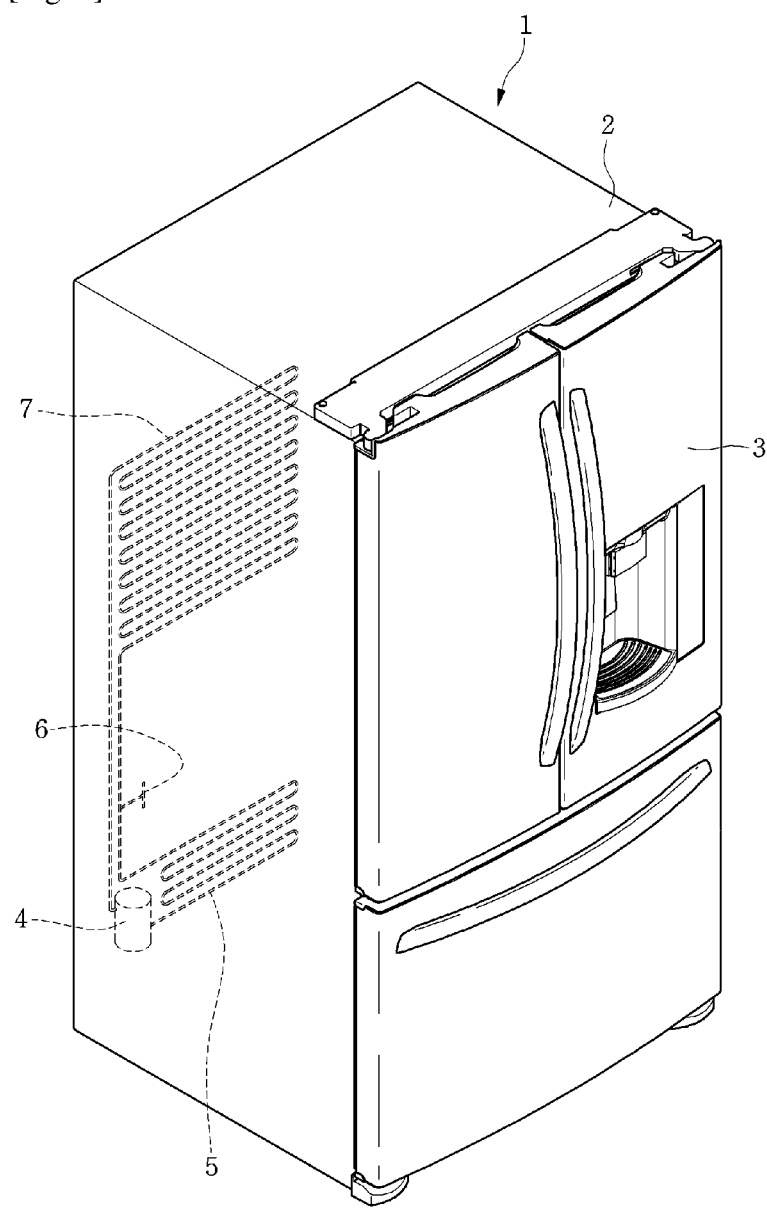

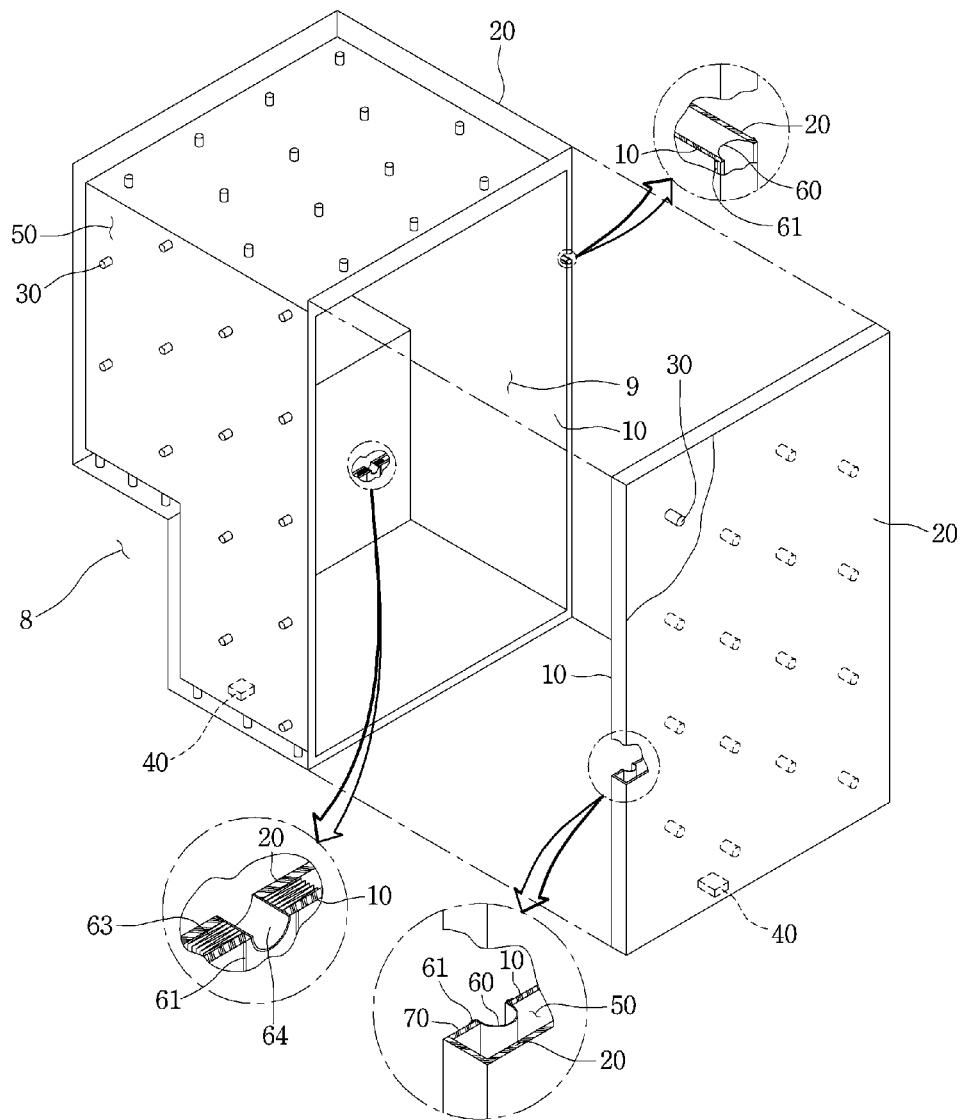
[Fig. 2]

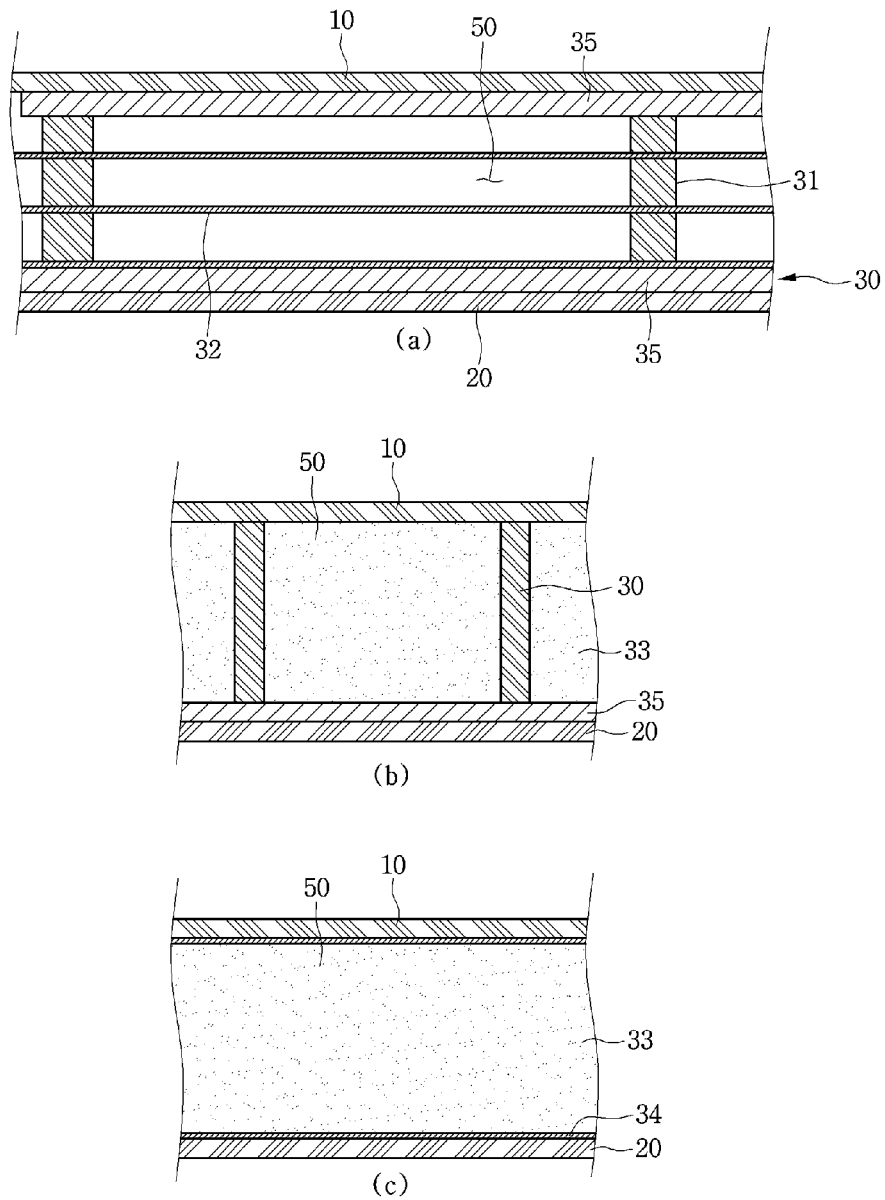
[Fig. 3]

[Fig. 4]
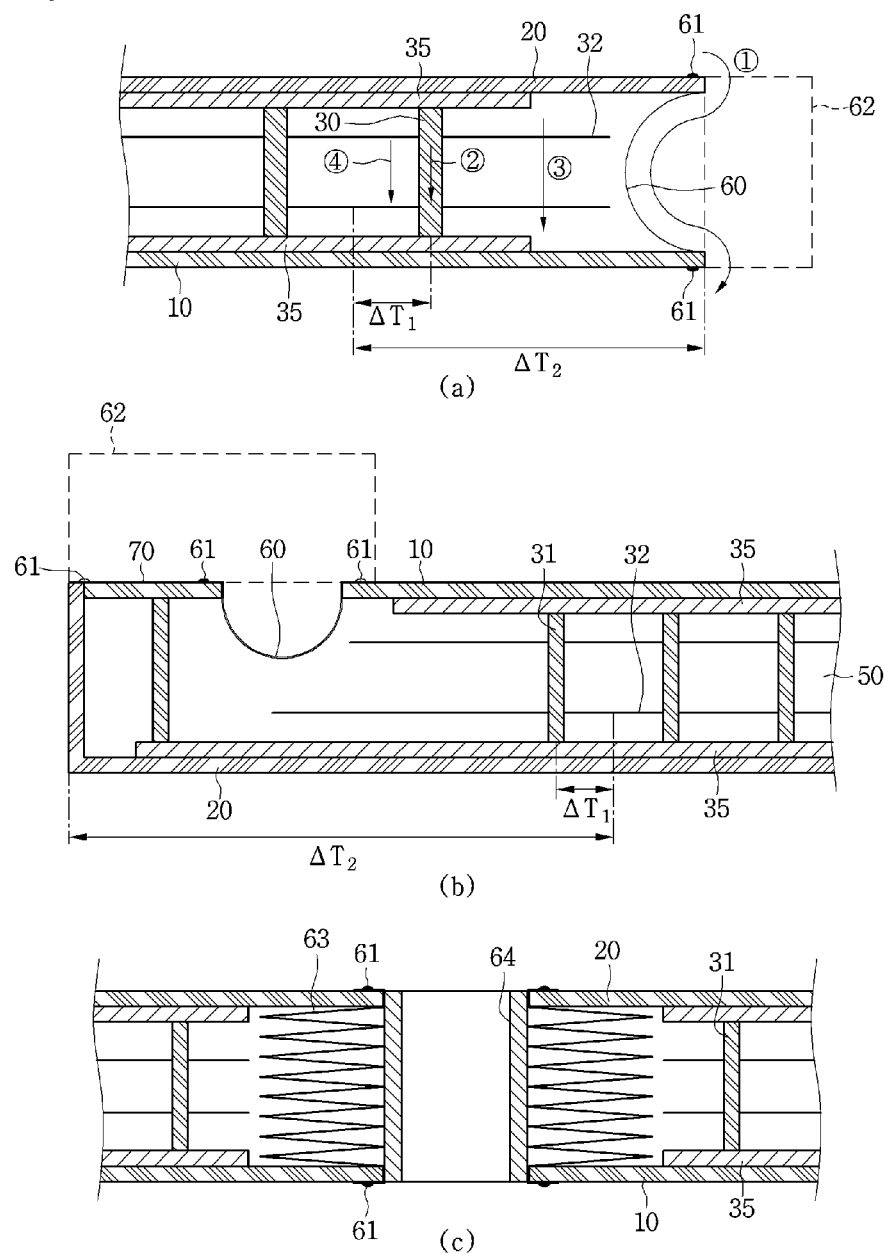

[Fig. 5]
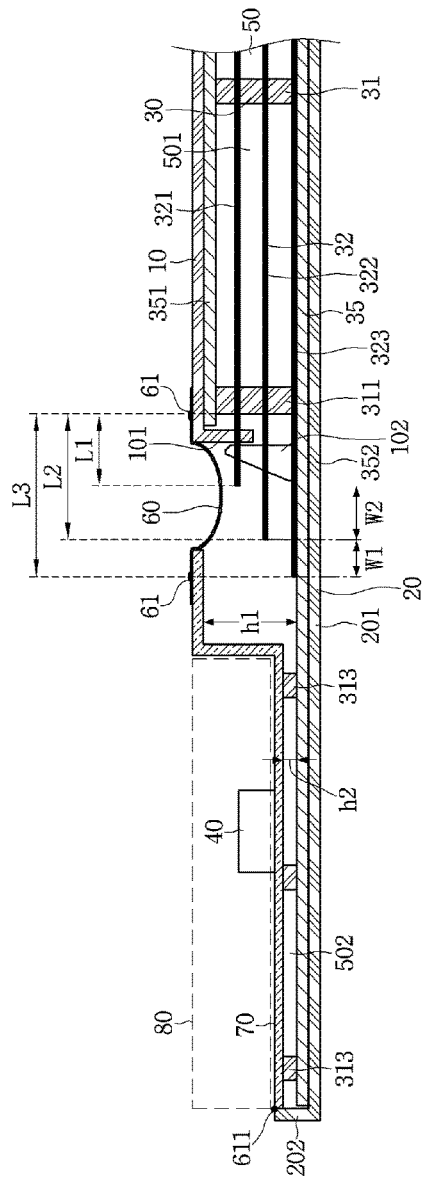
[Fig. 6]
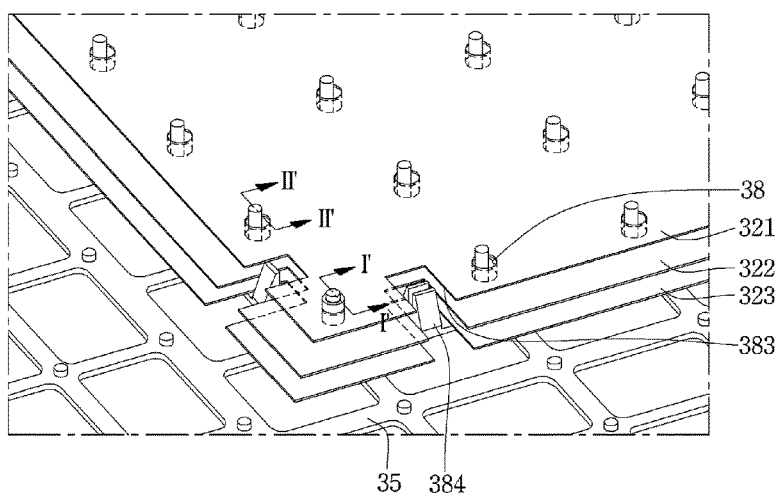

[Fig. 7]
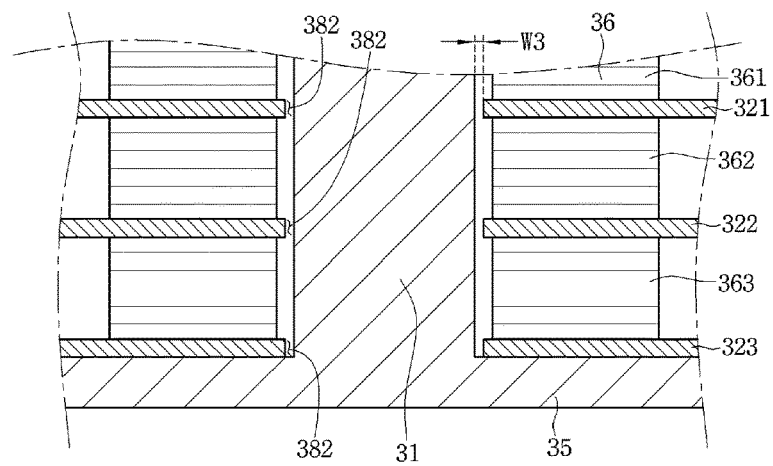
[Fig. 8]
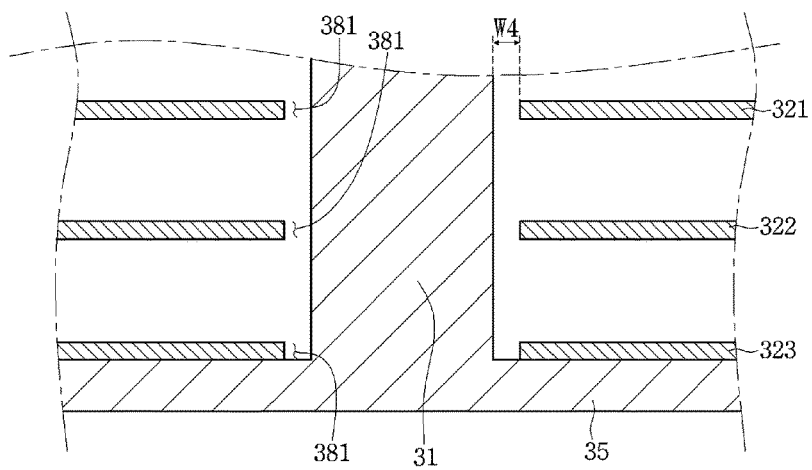
[Fig. 9]
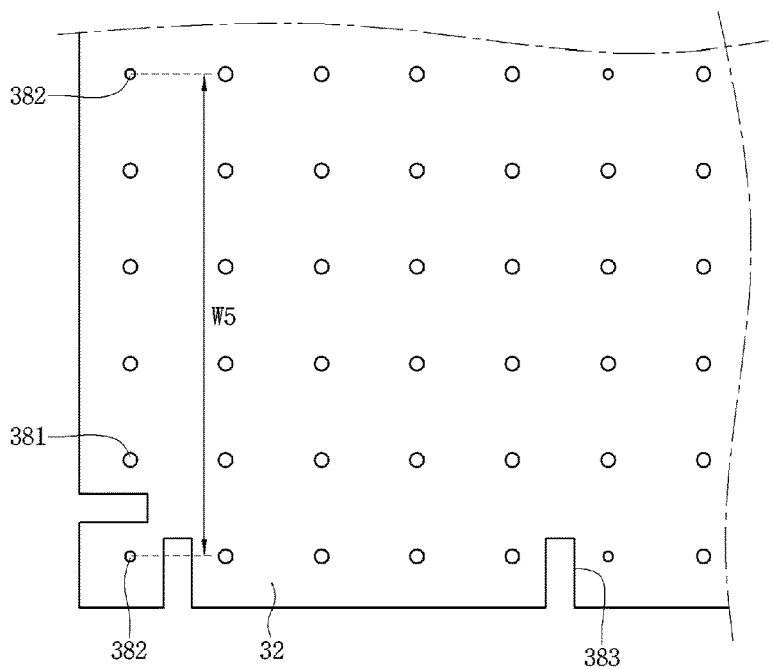

[Fig. 10]
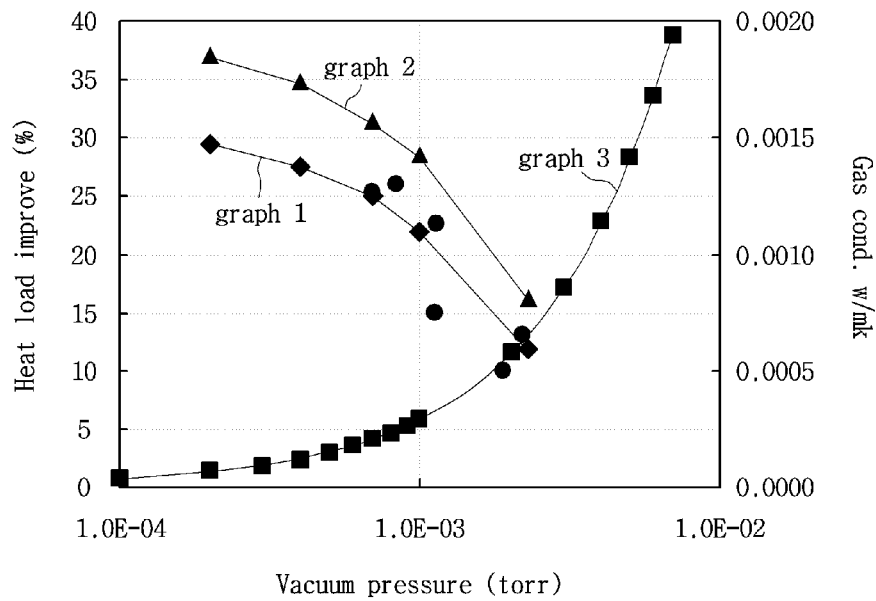
[Fig. 11]
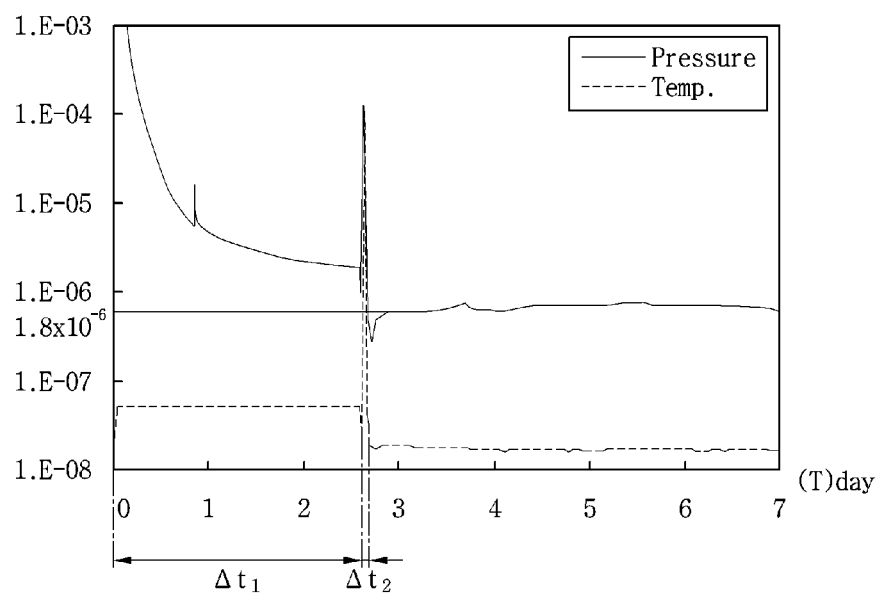

[Fig. 12]
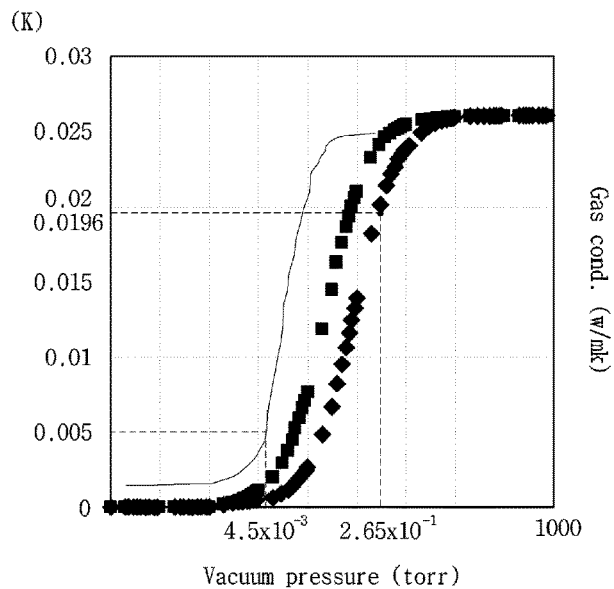
[Fig. 13]
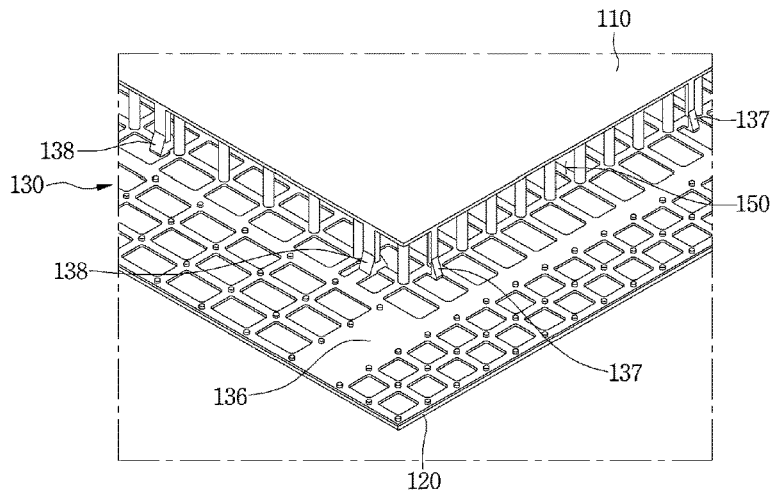
[Fig. 14]
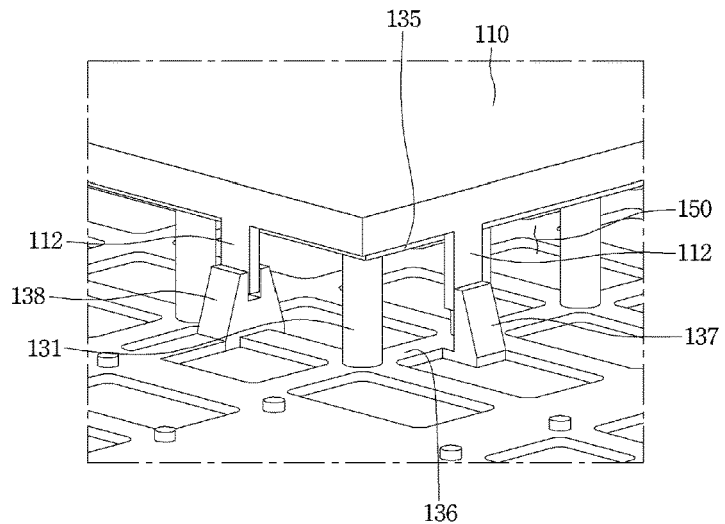

[Fig. 15]
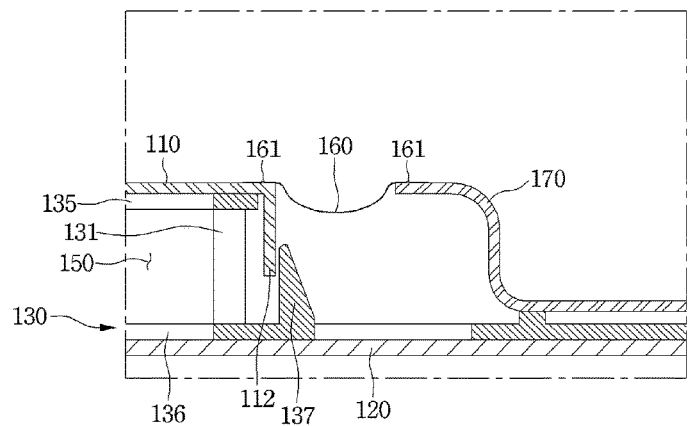
[Fig. 16]
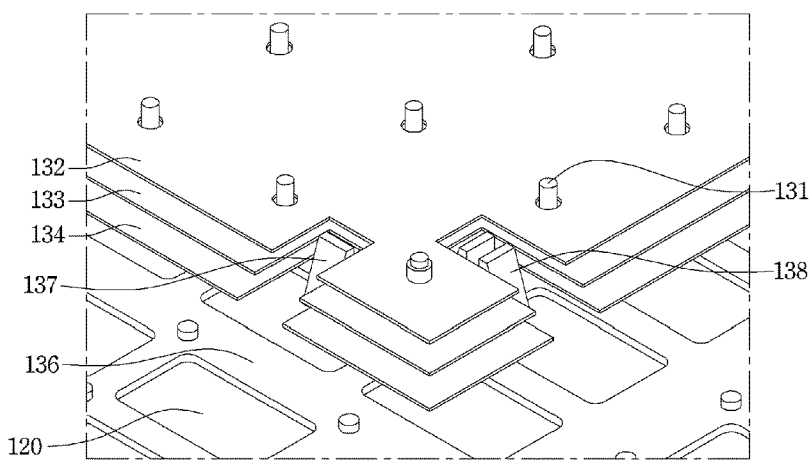
[Fig. 17]
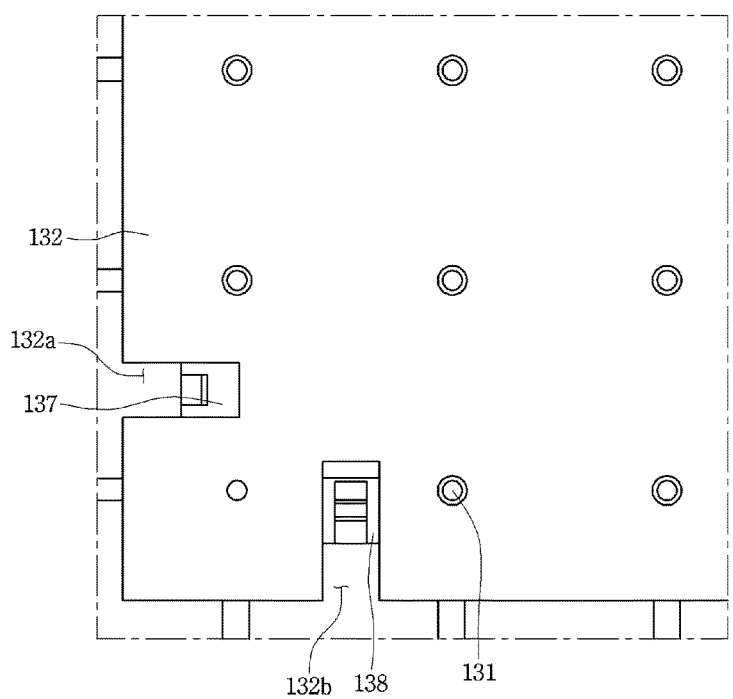

[Fig. 18]
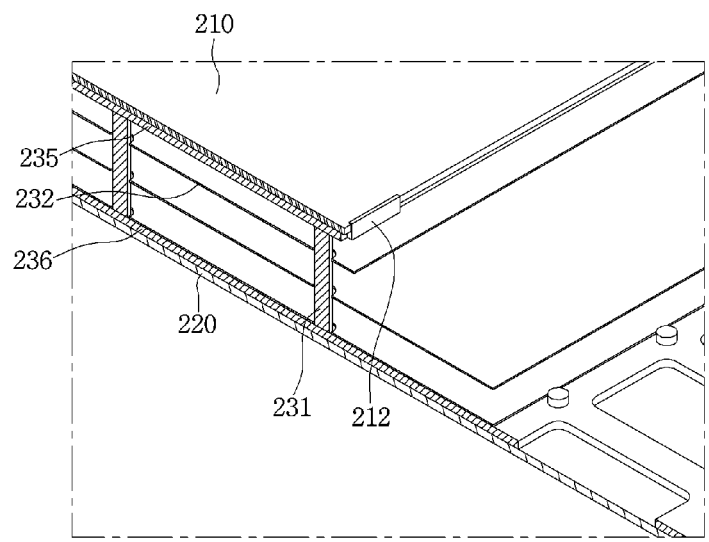
[Fig. 19]
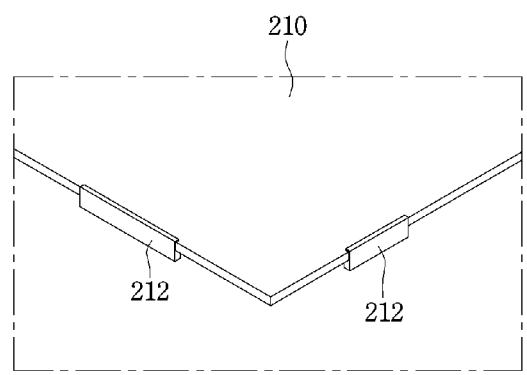
[Fig. 20]
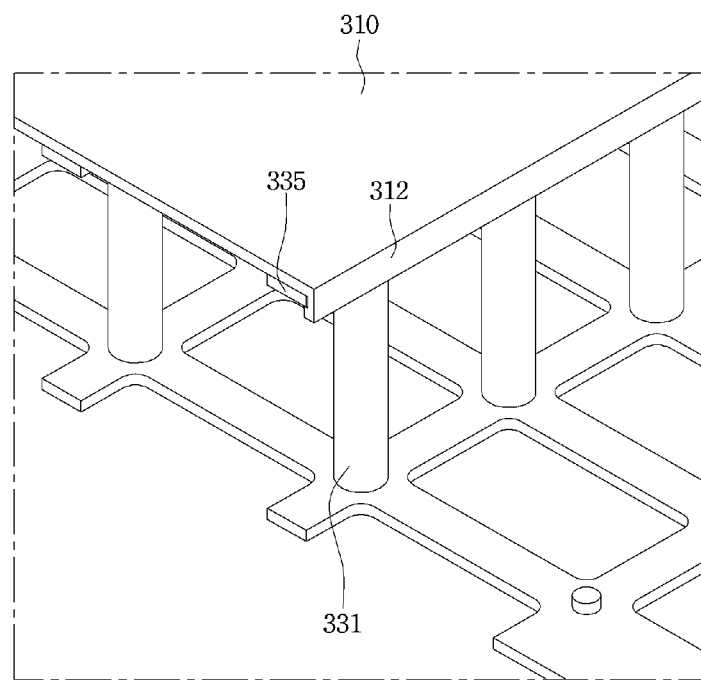

[Fig. 21]
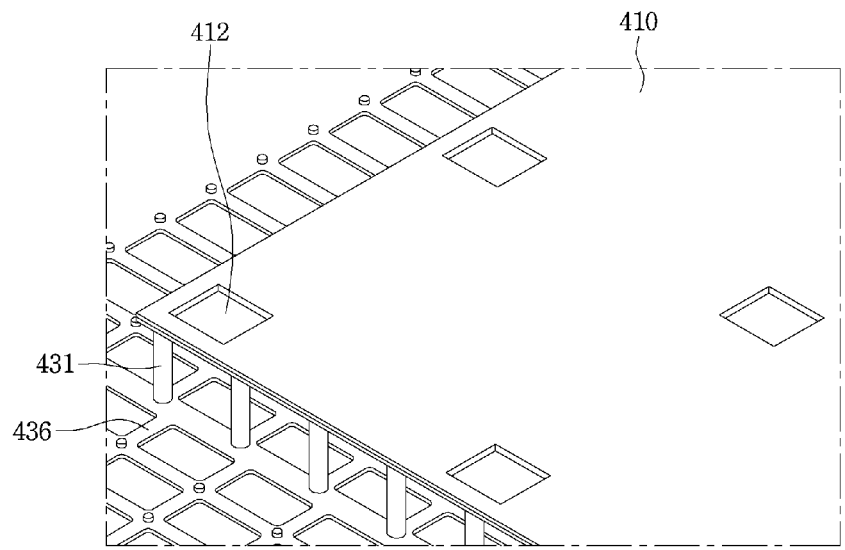
[Fig. 22]
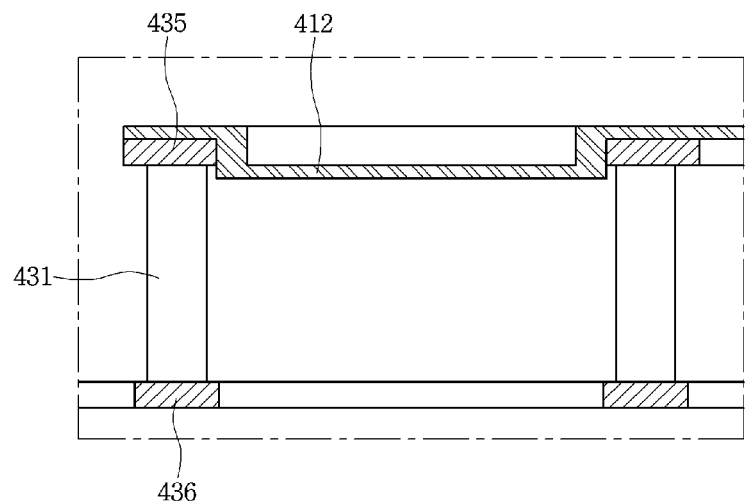
[Fig. 23]
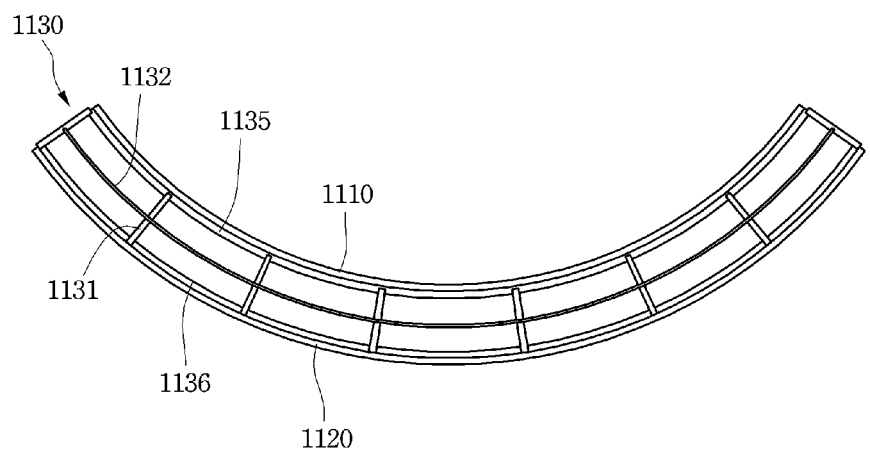

[Fig. 24]
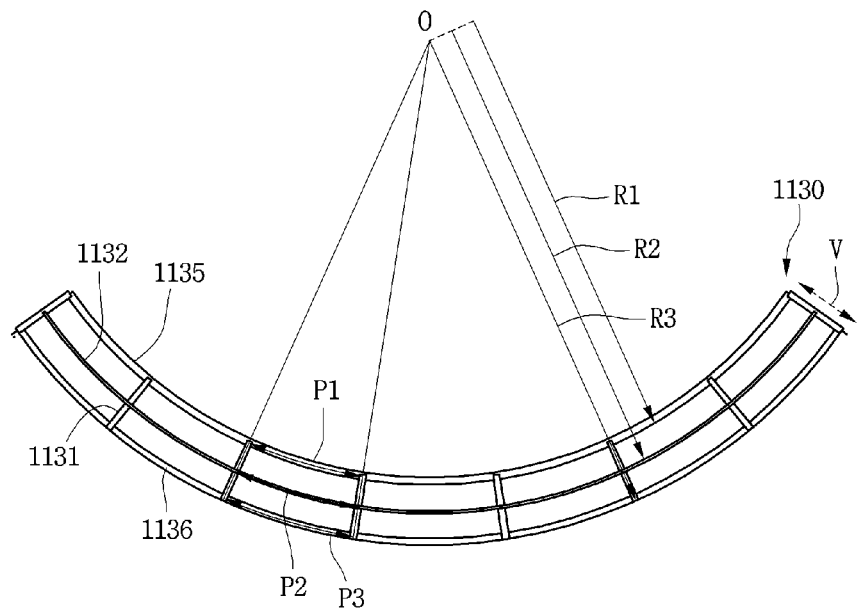
[Fig. 25]
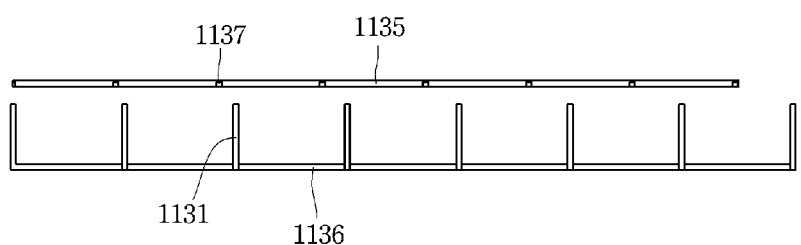
[Fig. 26]
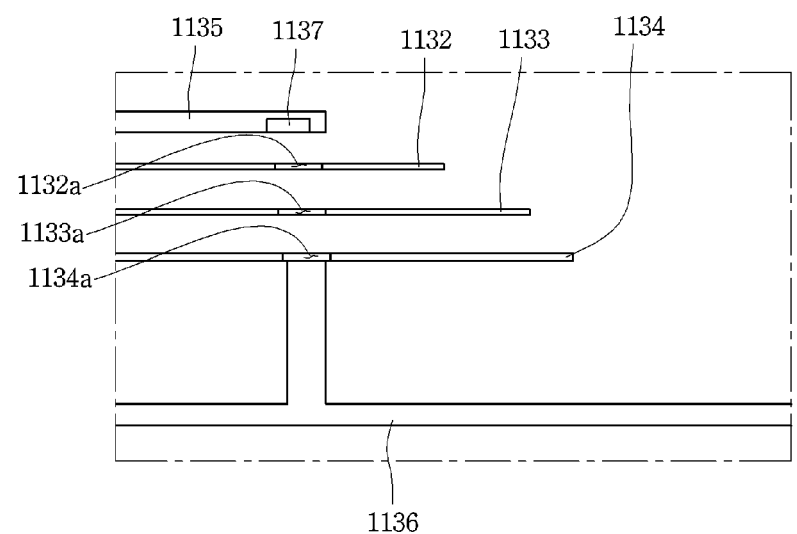

[Fig. 27]
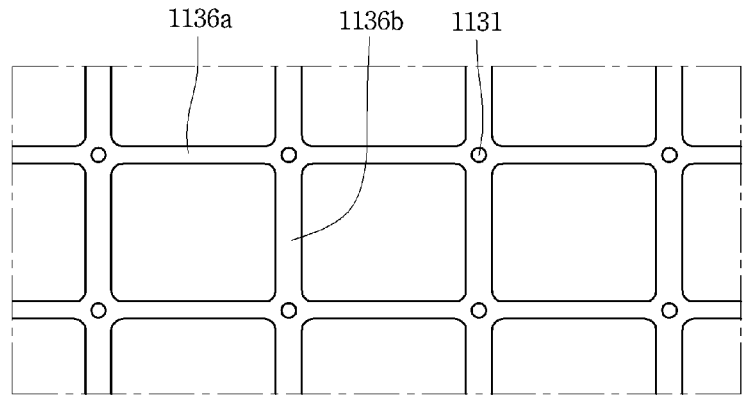
[Fig. 28]
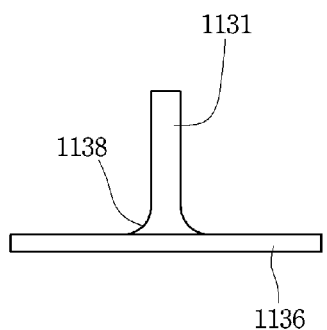
[Fig. 29]
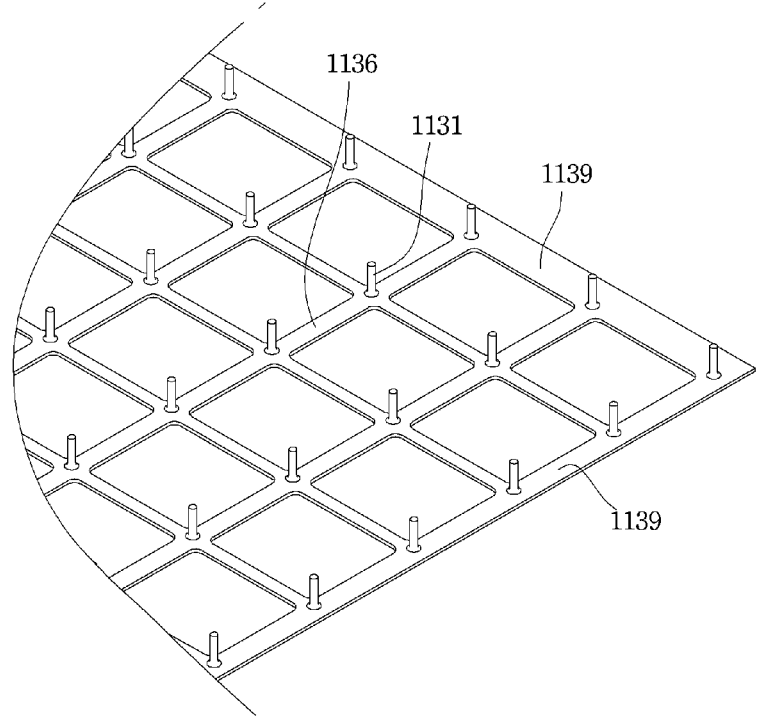

VACUUM ADIABATIC BODY AND REFRIGERATOR

CROSS-REFERENCE TO RELATED APPLICATIONS

This application is a U.S. National Stage Application under 35 U.S.C. § 371 of PCT Application No. PCT/KR2016/008512, filed Aug. 2, 2016, which claims priority to Korean Patent Application Nos. 10-2015-0109622, 10-2015-0109626, and 10-2015-0109721, all filed Aug. 3, 2015, whose entire disclosures are hereby incorporated by reference.

U.S. application Ser. Nos. 15/749,132; 15/749,139; 15/749,136; 15/749,143; 15/749,146; 15/749,156; 15/749,162; 15/749,140; 15/749,142; 15/749,147; 15/749,149; 15/749,179; 15/749,154; 15/749,161, all filed on Jan. 31, 2018, are related and are hereby incorporated by reference in their entirety. Further, one of ordinary skill in the art will recognize that features disclosed in these above-noted applications may be combined in any combination with features disclosed herein.

TECHNICAL FIELD

The present disclosure relates to a vacuum adiabatic body and a refrigerator.

BACKGROUND ART

A vacuum adiabatic body is a product for suppressing heat transfer by vacuumizing the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced. In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding such as Styrofoam (polystyrene). According to the method, additional foaming is not required, and the adiabatic performance of the refrigerator is improved. However, manufacturing cost is increased, and a manufacturing method is complicated.

As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, manufacturing cost is increased, and a manufacturing method is complicated.

As another example, there is an attempt to manufacture all walls of a refrigerator using a vacuum adiabatic body that is a single product. For example, a technique of providing an adiabatic structure of a refrigerator to be in a vacuum state has been disclosed in U.S. Patent Laid-Open Publication No. US 2004/0226956 A1 (Reference Document 3).

However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

DISCLOSURE

Technical Problem

Embodiments provide a vacuum adiabatic body and a refrigerator, which can obtain a sufficient adiabatic effect in a vacuum state and be applied commercially. Embodiments also provide a structure for improving the supporting ability of a plate member provided in a vacuum adiabatic body. Embodiments also provide a vacuum adiabatic body of which at least one portion forms a curved surface and a refrigerator including the same.

Technical Solution

In one embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein an extending part extending toward the third space to be coupled to the supporting unit is provided to at least one of the first and second plate members, and the extending part is formed to extend downward from an edge portion of the at least one of the first and second plate members.

In another embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein the supporting unit includes support plates respectively contacting the first and second plate members, and each of the first and second plate members and the support plates is provided as a curved surface, and is formed such that its curvature is increased as it is distant from the center of curvature.

In still another embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit including at least one radiation resistance sheet provided in a plate shape inside the third space to decrease a heat transfer amount between the first plate member and the second plate member; and an exhaust port through which a gas in the third space is exhausted, wherein the radiation resistance sheet is provided with at least one first hole having a small diameter and at least one second hole having a large diameter, so that bars of the supporting unit are inserted into the first and second holes, and a number of the first holes is smaller than that of the second holes.

In still another embodiment, a refrigerator includes: a main body provided with an internal space in which storage goods are stored; and a door provided to open/close the main body from an external space, wherein, in order to supply a refrigerant into the main body, the refrigerator includes: a compressor for compressing the refrigerant; a condenser for condensing the compressed refrigerant; an expander for expanding the condensed refrigerant; and an evaporator for evaporating the expanded refrigerant to take heat, wherein at least one of the main body and the door includes a vacuum adiabatic body, wherein the vacuum adiabatic body includes: a first plate member defining at least one portion of a wall for the internal space; a second plate member defining at least one portion of a wall for the external space; a sealing part sealing the first plate member and the second plate member to provide a vacuum space part that has a temperature between a temperature of the internal space and a temperature of the external space and is in a vacuum state; a supporting unit maintaining the vacuum space part; a heat resistance unit connected to at least one of the first and second plate members, the heat resistance unit decreasing a heat transfer amount between the first plate member and the second plate member; and an exhaust port through which a gas in the vacuum space part is exhausted, wherein at least one of the first and second plate members is provided with an extending part extending toward the vacuum space part, the extending part being coupled to the supporting unit.

Advantageous Effects

According to the present disclosure, it is possible to provide a vacuum adiabatic body having a vacuum adiabatic effect and a refrigerator including the same. Also, the vacuum adiabatic body of the present disclosure can effectively overcome radiation heat transfer of the vacuum space part. According to the present disclosure, it is possible to sufficiently resist heat transfer through a structure for resisting radiation heat transfer.

Also, it is possible to improve the supporting ability of the plate member using the supporting unit. Also, components constituting the vacuum adiabatic body are not formed to have curved surfaces through injection molding, but formed by changing only an assembling process, so that it is possible to manufacture a vacuum adiabatic body formed in a curved shape.

DESCRIPTION OF DRAWINGS

FIG. 1 is a perspective view of a refrigerator according to an embodiment.

FIG. 2 is a view schematically showing a main body of the refrigerator and a vacuum adiabatic body according to an embodiment.

FIG. 3 is a view showing various embodiments of an internal configuration of a vacuum space part.

FIG. 4 is a view showing various embodiments of conductive resistance sheets and peripheral parts thereof.

FIG. 5 is a view showing in detail a vacuum adiabatic body according to a second embodiment.

FIG. 6 is view showing a state in which a radiation resistance sheet is fastened to a supporting unit of FIG. 5.

FIG. 7 is a sectional view taken along line I-I' of FIG. 6.

FIG. 8 is a sectional view taken along line II-II' of FIG. 6.

FIG. 9 is a plan view of one vertex portion of the radiation resistance sheet of FIG. 5.

FIG. 10 illustrates graphs showing changes in adiabatic performance and changes in gas conductivity with respect to vacuum pressures by applying a simulation.

FIG. 11 illustrates graphs obtained by observing, over time and pressure, a process of exhausting the interior of the vacuum adiabatic body when a supporting unit is used.

FIG. 12 illustrates graphs obtained by comparing vacuum pressures and gas conductivities.

FIG. 13 is a view illustrating a correlation between a supporting unit and a first plate member of a vacuum adiabatic body according to a third embodiment, which shows any one edge portion.

FIG. 14 is an enlarged view of FIG. 13.

FIG. 15 is a longitudinal sectional view of FIG. 13.

FIG. 16 is a view showing the supporting unit and a radiation resistance sheet of FIG. 13.

FIG. 17 is a plan view of FIG. 16.

FIG. 18 is a view showing a vacuum adiabatic body according to a fourth embodiment.

FIG. 19 is a view showing a first plate member of FIG. 18.

FIG. 20 is a view showing a vacuum adiabatic body according to a fifth embodiment.

FIG. 21 is a view showing a vacuum adiabatic body according to a sixth embodiment.

FIG. 22 is a longitudinal sectional view of FIG. 21.

FIG. 23 is a view showing a vacuum adiabatic body according to a seventh embodiment.

FIG. 24 is a view showing a supporting unit of FIG. 23.

FIG. 25 is an exploded view of the supporting unit of FIG. 23.

FIG. 26 is a view showing a case where a plurality of radiation resistance sheets are provided in the supporting unit of FIG. 23.

FIG. 27 is a view showing the supporting unit of FIG. 23, viewed from the top.

FIG. 28 is a view showing a side of the supporting unit of FIG. 23.

FIG. 29 is a view showing an edge portion of a support plate of FIG. 23.

MODE FOR INVENTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment. FIG. 2 is a view schematically showing a main body of the refrigerator and a vacuum adiabatic body according to an embodiment. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIGS. 1 and 2, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9 may be included. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

The vacuum adiabatic body includes a first plate member (or first plate) 10 for providing a wall of a low-temperature space, a second plate member (or second plate) 20 for providing a wall of a high-temperature space, and a vacuum space part (or vacuum space) 50 defined as a gap part between the first and second plate members 10 and 20. Also, the vacuum adiabatic body includes the conductive resistance sheets 60 and 62 for preventing heat conduction between the first and second plate members 10 and 20.

A sealing part (or seal) 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view showing various embodiments of an internal configuration of the vacuum space part. First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20.

In addition, based on the extending direction of the bars 31, a total sectional area of the support plate 35 is provided to be greater than that of the bars 31, so that heat transferred through the bars 31 can be diffused through the support plate 35. A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred.

In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer. In this embodiment, the vacuum adiabatic body can be manufactured without using the radiation resistance sheet 32.

Referring to FIG. 3c, the supporting unit 30 maintaining the vacuum space part 50 is not provided. Instead of the supporting unit 30, the porous material 33 is provided in a state in which it is surrounded by a film 34. In this case, the porous material 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be manufactured without using the supporting unit 30. In other words, the porous material 33 can serve together as the radiation resistance sheet 32 and the supporting unit 30.

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in units of micrometers so as to reduce the amount of heat conducted along the wall for the third space. The sealing parts 61 may be provided as welding parts. That is, the conductive resistance sheet 60 and the plate members 10 and 20 may be fused to each other.

In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat (or convection) ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK_{solidconductionheat} > eK_{radiationtransferheat} > eK_{gasconductionheat} \quad \text{[Math Figure 1]}$$

Here, the effective heat transfer coefficient (eK) is a value that can be measured using a shape and temperature differences of a target product. The effective heat transfer coefficient (eK) is a value that can be obtained by measuring a total heat transfer amount and a temperature of at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit.

Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑥ may be a sum of the supporter conduction heat ② and the radiation transfer heat ④. The porous material conduction heat ⑤ may be changed depending on various variables including a kind, an amount, and the like of the porous material.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest.

For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may be a bad influence on the external appearance of refrigerator. The radiation resistance sheet 32 may be preferably made of a material that has a low emissivity and can be easily subjected to thin film processing. Also, the radiation resistance sheet 32 is to ensure a strength high enough not to be deformed by an external impact. The supporting unit 30 is provided with a strength high enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a predetermined strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness high enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet.

The conductive resistance sheet may be preferably made of a material that is easily deformed by the vacuum pressure and has the lowest stiffness. Even when the porous material 33 is filled in the vacuum space part 50, the conductive resistance sheet may preferably have the lowest stiffness, and the plate member and the side frame may preferably have the highest stiffness.

FIG. 5 is a view showing in detail a vacuum adiabatic body according to a second embodiment. The embodiment proposed in FIG. 5 may be preferably applied to the door-side vacuum adiabatic body, and the description of the vacuum adiabatic body shown in FIG. 4b among the vacuum adiabatic bodies shown in FIG. 4 may be applied to portions to which specific descriptions are not provided.

Referring to FIG. 5, the vacuum adiabatic body may include a first plate member 10, a second plate member 20, a conductive resistance sheet 60, and a side frame 70, which are parts that enable a vacuum space part 50 to be separated from an external atmospheric space. The side frame 70 is formed in a bent shape, and may be provided such that an outer portion, i.e., an edge portion when viewed from the entire shape of the vacuum adiabatic body is lowered. The side frame 70 may be provided in a shape in which a gap part between the side frame 70 and the second plate member 20 is divided into a part having a high height as h1 and a part having a low height as h2.

According to the above-described shape, the part at which the height of the side frame 70 is low can ensure a predetermined space as compared with another part at the exterior of the vacuum adiabatic body. An additional mounting part 80 in which an addition such as an exhaust port or a door hinge is mounted may be provided due to a height difference of the side frame 70. Accordingly, it is possible to maximally ensure the internal volume of a product such as the refrigerator provided by the vacuum adiabatic body, to improve an adiabatic effect, and to sufficiently ensure functions of the product.

One end of the side frame 70 is fastened to the conductive resistance sheet 60 by a sealing part 61, and the other end of the side frame 70 is fastened to the second plate member 20 by an edge part (or edge seal) 611. The edge part 611 may be provided as a welding part. The vacuum space part 50 extends up to the edge part 611, thereby improving an adiabatic effect.

The side frame 70 provides a path through which solid conduction heat passing through the conductive resistance sheet 60 passes. In the refrigerator, cold air passing through the conductive resistance sheet 60 may be transferred to the edge part 611 that is a contact point between the side frame 70 and a side part 202 of the second plate member 20. However, the cold air may not only be reduced by the conductive resistance sheet 60 but also sufficiently resist while flowing along the side frame 70.

The second plate member 20 includes a front part (or front face) 201 and the side part (or side face) 202 bent from the front part 201, and the side part 202 is not exposed to the exterior. Thus, although dew is formed on the side part 202, the dew is not recognized by a user, thereby improving a user's emotion. In addition, when the edge part 611 is provided as a welding part, a welding line inevitably generated due to heating is not viewed from the exterior, thereby improving a user's sense of beauty. It can be easily assumed that the side part 202 forms an outer wall of the vacuum space part 50.

The edge part 611 may be provided to not only the side part 202 but also a corner portion of the front part 201 adjacent to the side part 202, not to be easily observed by the user. As another example, the edge part 611 may be provided to an edge portion of the second plate member 20, to enhance convenience of manufacturing while the edge part 611 is not observed with the naked eye.

In the refrigerator, the cold air passing through the conductive resistance sheet 60 is transferred to the side frame 70, and hence the side frame 70 has a relatively higher temperature than the first plate member 10. Thus, a temperature of the side frame 70 contacting a second bar 313 can be maintained higher than that of a place contacting a first bar 311. Accordingly, although lengths of the first and second bars 311 and 313 are different from each other, heat conduction through the first bar 311 can be maintained equal to that through the second bar 313. According to an experiment, it has been found that a second vacuum space part (or second vacuum space) 502 having a height of 1 to 2 mm can obtain a sufficient adiabatic effect equal to that of a first vacuum space part (or first vacuum space) 501 having a height of 10 to 20 mm.

The vacuum space part 50 includes the first vacuum space part 501 of which height is h1 and the second vacuum space part 502 of which height is h2 smaller than h1. The first and second vacuum space parts 501 and 502 can communicate with each other in a vacuum state. Accordingly, it is possible to reduce inconvenience of a manufacturing process in which a vacuum space part is separately formed.

A second support plate 352 may be provided to extend inside the second vacuum space part 502. In addition, the second bar 313 having a lower height than the first bar 311 may be provided to the second support plate 352. Thus, the gap of the second vacuum space part 502 can be maintained by the second bar 313. The second bar 313 may be provided as a single body with the second support plate 352. Since the heights of the first and second vacuum space parts 501 and 502 are different from each other, a first support plate 351 may not extend to the second vacuum space part 502. Although the first support plate 351 does not extend to the second vacuum space part 502, the flow of heat conducted from the first plate member 10 to the side frame 70 is resisted by the conductive resistance sheet 60, and thus conduction heat through the second bar 313 can obtain an equal effect of heat resistance as compared with heat conduction through the first bar 313.

As already described above, the conductive resistance sheet 60 has one purpose to resist heat transfer from the first plate member 10. Therefore, a rapid change in temperature occurs in the conductive resistance sheet 60 along the direction of the heat transfer. It has been described that the shielding part 62 is provided to block heat transferred to the outside of the vacuum adiabatic body, corresponding to the rapid change in temperature. Similarly, heat transferred to the inside of the vacuum adiabatic body is provided by the vacuum space part 50. The heat can obtain an adiabatic effect with respect to convection and solid conduction heat, but is weak against heat transfer caused by radiation and gas conduction. In order to solve such a problem, a radiation resistance sheet 32 may be placed even under a lower side of the conductive resistance sheet 60.

Specifically, the radiation resistance sheet 32 may include first, second, and third radiation resistance sheets 321, 322, and 323 sequentially provided in a direction toward the second support plate 352 from the first support plate 351. The first radiation resistance sheet 321 may extend up to the lower side of the conductive resistance sheet 60 by passing through an end portion of the first support plate 351. The second radiation resistance sheet 322 may extend outward by w2 as compared with the first radiation resistance sheet 321. The third radiation resistance sheet 323 may extend outward by w1 as compared with the second radiation resistance sheet 322.

According to such a configuration, the radiation resistance sheet 32 provided as a thin plate may be deformed by an external impact and load. This is because, if any deformed radiation resistance sheet contacts another adjacent radiation resistance sheet or the conductive resistance sheet 60, direct heat conduction occurs, and therefore, loss of heat insulation occurs. Therefore, the first radiation resistance sheet 321 may extend not to reach the center of the conductive resistance sheet 60 even when a predetermined deformation occurs in the first radiation resistance sheet 321. Since it is less likely that the second radiation resistance sheet 322 will contact the conductive resistance sheet 60, the second radiation resistance sheet 322 may extend further outward by passing through the center of the conductive resistance sheet 60.

However, since it is likely that the second radiation resistance sheet 322 will contact another adjacent radiation resistance sheet, a length of the second radiation resistance sheet 322 extending from the first bar 311 is preferably limited to 10 to 15 mm when the radiation resistance sheet is an aluminum sheet having a thickness of 0.3 to 0.4 mm. The third radiation resistance sheet 323 may extend outward by w1 as compared with the second radiation resistance sheet 322. This is because the third radiation resistance sheet 323 is supported by the second support plate 352.

In FIG. 5, it is illustrated that the radiation resistance sheet 32 does not extend inside the second vacuum space part 502. However, the present disclosure is not limited thereto, and the third radiation resistance sheet 323 of which at least one portion is provided to contact the second support plate 352 may extend up to the inside of the second vacuum space part 502, thereby reducing radiation conduction heat.

A mounting end part (or side surface) 101 is provided at a corner of the first plate member 10, and a rib 102 is provided in the supporting unit 30. As the mounting end part 101 is guided by the rib 102, the first plate member 10 and the supporting unit 30 can be placed at accurate positions, respectively. Thus, it is possible to improve fastening accuracy between parts.

Since the radiation resistance sheet 32 is provided as the thin plate, deformation may easily occur in the radiation resistance sheet 32 due to an external impact. Also, when the radiation resistance sheet 32 is not supported by a predetermined distance, deformation may occur in the radiation resistance sheet 32 due to an external impact and a self load.

If the radiation resistance sheet 32 is deformed, another part contacts the radiation resistance sheet 32, and hence, the adiabatic effect may be reduced. Therefore, when a radiation resistance sheet is provided, it is sufficiently considered not only that the radiation resistance sheet can sufficiently resist radiation heat but also that the above-described deformation does not occur.

FIG. 6 is view showing a state in which the radiation resistance sheet is fastened to the supporting unit of FIG. 5. Referring to FIG. 6, as bars 31 are inserted into holes 38 provided in the radiation resistance sheet 32, respectively, the radiation resistance sheet 32 can be placed inside the vacuum space part 50. The holes 38 and the bars 31 are provided at a predetermined distance. Some of the bars 31 are provided to perform a function of actually fixing the radiation resistance sheet 32 and, simultaneously, to maintain the gap of the vacuum space part 50.

In other words, when the bars 31 extend to maintain the distance between the plate members, the bars 31 pass through the radiation resistance sheet 32. At this time, the holes 38 are also to be provided to allow the bars 31 not to interfere with the radiation resistance sheet 32. Here, bars 31 may be integrally provided to a support plate 35.

The radiation resistance sheet 32 may be provided in at least two, preferably, three or more so as to perform an action of sufficient radiation resistance. In order to sufficiently derive the effect of radiation resistance using the plurality of radiation resistance sheets 321, 322, and 323, the radiation resistance sheets are preferably located such that the internal gap of the vacuum space part can be equally divided. In other words, the radiation resistance sheets are preferably located such that gaps between the radiation resistance sheets can be sufficiently maintained. To this end, gap blocks 36 (see FIG. 7) may be provided to maintain gaps between the plate members 10 and 20 and the radiation resistance sheets and gaps between the radiation resistance sheets.

A mounting rib 384 may be provided to perform coupling between the support plates or coupling between the supporting unit and the first plate member 10. In addition, an insertion groove 383 is provided at an edge portion of the radiation resistance sheet 32 such that the mounting rib 384 does not interfere with the radiation resistance sheet 32. Since the mounting rib 384 is inserted through the insertion groove 383, the radiation resistance sheet 32 can extend further outward, and can more stably resist radiation heat transfer.

FIG. 7 is a sectional view taken along line I-I' of FIG. 6. FIG. 8 is a sectional view taken along line II-II' of FIG. 6. Here, FIG. 7 is a sectional view showing first holes 382 through which the bar 31 passes to support the radiation resistance sheet 32 and surroundings of the first holes 382, and FIG. 8 is a sectional view showing second holes 381 through which the bar 31 passes without supporting the radiation resistance sheet 32 and surroundings of the second holes 382.

Referring to FIG. 7, the plurality of radiation resistance sheets 321, 322, and 323 provided in the first holes 382 and the bar 31 passing through the first holes 382 are illustrated. In addition, gap blocks 361, 362, and 363 are provided to maintain gaps between the radiation resistance sheets and gaps between the radiation resistance sheets and the support plate 35. The first hole 382 may be provided to have a diameter to an extent where only a predetermined assembly tolerance is included in the diameter of the bar 31 such that the position of the radiation resistance sheets can be guided with respect to the bar 31.

When the first hole 382 is extremely small, it is difficult to put the radiation resistance sheet 32 into the bar 31, and hence the thin radiation resistance sheet 32 is frequently damaged. Therefore, the diameter of the first hole 382 is to be provided by further reflecting a length longer than the assembly tolerance. On the other hand, when the first hole 382 is extremely large, vibration is generated even in a state in which the radiation resistance sheet 32 is supported by the bar 31, and hence the radiation resistance sheet 32 may be deformed.

Therefore, the diameter of the first hole 382 is preferably provided by further reflecting a length of only the assembly tolerance. Under such circumferences, the present inventor has found that the assembly tolerance is preferably provided as 0.1 to 0.5 mm. In FIG. 7, it may be considered that a value obtained by adding two W3s at both sides about the bar 31 is the assembly tolerance.

Meanwhile, the first hole 382 is preferably disposed such that any portion of the radiation resistance sheet 32 does not contact the bar 31. This is because, if the radiation resistance sheet 32 contacts the bar 31, heat conduction occurs, and therefore, the adiabatic effect is reduced.

Referring to FIG. 8, the plurality of radiation resistance sheets 321, 322, and 323 provided in the second holes 381 and the bar 31 passing through the second holes 381 are illustrated. When the second hole 381 is extremely small, the radiation resistance sheet 32 contacts the bar 31, and therefore, adiabatic loss may be caused. When the second hole 381 is extremely large, loss of radiation heat may occur through a gap part between the bar 31 and the second hole 381. Under such circumferences, the present inventor has found that a sum of both gaps between the second hole 381 and the bar 31 is preferably provided as 0.3 to 1.5 mm.

In FIG. 8, a value obtained by adding two W4s at both sides about the bar 31 may correspond to 0.3 to 1.5 mm. Meanwhile, the gap block 36 is provided to be larger than both of the holes 381 and 382, so that the gap maintenance action of the radiation resistance sheet 32 can be performed without any problem.

FIG. 9 is a plan view of one vertex portion of the radiation resistance sheet of FIG. 5. Referring to FIG. 9, the first holes 382 having a small diameter and the second holes 381 having a larger diameter than the first holes 382 are machined in the radiation resistance sheet 32. It has already been described that the holes 381 and 382 have a function of allowing the bar 31 to pass therethrough and a function of supporting the radiation resistance sheet.

The first holes 382 are preferably provided as dense as possible so as to prevent vibration of the radiation resistance sheet 32. However, as the number of the first holes 382 is increased, a portion at which the bar 31 and the radiation resistance sheet 32 contact each other or are adjacent to each other is increased, and hence adiabatic performance may be degraded. By considering the above-described two conditions, the distance between the first holes 382 does not preferably exceed a maximum of 200 mm when the radiation resistance sheet 32 is an aluminum foil having a thickness of 0.3 mm. When the section of the door 3 is provided in a curved shape, the radiation resistance sheet 32 is also provided in a curved shape. Hence, it is required to further maintain the distance between the first holes 382 so as to avoid contact between the radiation resistance sheets.

Under such a background, the distance between the first holes 382, which is indicated by W5, does not preferably exceed a maximum of 200 mm. In addition, the first holes 382 are preferably provided an outermost portion from the center of the radiation resistance sheet 32 and a vertex portion of the radiation resistance sheet 32. This is for the purpose to prevent the degradation of the adiabatic performance, caused by contact between the radiation resistance sheet 32 and the bar 31, and to prevent the degradation of the adiabatic performance by allowing the radiation resistance sheet 32 to extend as outward as possible.

In addition, three second holes 381 may be provided between a pair of first holes 382 adjacent to each other. In any one radiation resistance sheet, a number of the first holes 382 is more preferably smaller than that of the second holes 381 so as to prevent the degradation of the adiabatic performance.

Hereinafter, a vacuum pressure preferably determined depending on an internal state of the vacuum adiabatic body will be described. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part 50 may resist the heat transfer by applying only the supporting unit 30. Alternatively, the porous material 33 may be filled together with the supporting unit in the vacuum space part 50 to resist the heat transfer. Alternatively, the vacuum space part may resist the heat transfer not by applying the supporting unit but by applying the porous material 33.

The case where only the supporting unit is applied will be described. FIG. 10 illustrates graphs showing changes in adiabatic performance and changes in gas conductivity with respect to vacuum pressures by applying a simulation. Referring to FIG. 10, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased.

However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

FIG. 11 illustrates graphs obtained by observing, over time and pressure, a process of exhausting the interior of the vacuum adiabatic body when the supporting unit is used. Referring to FIG. 11, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$).

After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{(-6)}$ Torr. In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{(-6)}$ Torr.

FIG. 12 illustrates graphs obtained by comparing vacuum pressures and gas conductivities. Referring to FIG. 12, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm.

The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{(-1)}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{(-3)}$ Torr. The vacuum pressure of $4.5 \times 10^{(-3)}$ Torr can be defined as the point at which the reduction in adiabatic effect caused by gas conduction heat is saturated. Also, when the effective heat transfer coefficient is 0.1 W/mK, the vacuum pressure is $1.2 \times 10^{(-2)}$ Torr.

When the vacuum space part 50 is not provided with the supporting unit but provided with the porous material, the size of the gap ranges from a few micrometers to a few hundredths of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{(-4)}$ Torr.

Also, the vacuum pressure at the point at which the reduction in adiabatic effect caused by gas conduction heat is saturated is approximately $4.7 \times 10^{(-2)}$ Torr. Also, the pressure where the reduction in adiabatic effect caused by gas conduction heat reaches the typical effective heat transfer coefficient of 0.0196 W/mK is 730 Torr. When the supporting unit and the porous material are provided together in the vacuum space part, a vacuum pressure may be created and used, which is middle between the vacuum pressure when only the supporting unit is used and the vacuum pressure when only the porous material is used.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

Hereinafter, a vacuum adiabatic body according to a third embodiment will be described.

FIG. 13 is a view illustrating a correlation between a supporting unit and a first plate member of a vacuum adiabatic body according to a third embodiment, which shows any one edge portion. FIG. 14 is an enlarged view of FIG. 13. FIG. 15 is a longitudinal sectional view of FIG. 13.

Referring to FIGS. 13 to 15, the vacuum adiabatic body according to the embodiment includes a first plate member (or first plate) 110 providing a wall for a low-temperature space, a second plate member (or second plate) 120 providing a wall for a high-temperature space, and a vacuum space part (or vacuum space) 150 defined as a gap part between the first and second plate members 110 and 120, and a supporting unit (or support) 130 for reducing deformation of the vacuum space part 150.

The supporting unit 130 may include a plurality of bars 131 interposed between the first and second plate members 110 and 120, a first support plate 135 provided at one ends of the plurality of bars 131, and a second support plate 136 provided at the other ends of the plurality of bars 131.

For pitches between the plurality of bars 131, a pitch at a portion adjacent to an edge portion of the first plate member 110 or an edge portion of the second plate member 120 may be formed narrower than those of the other portions. This is because the supporting ability of the edge portion of each of the first and second plate members 110 and 120 is weak as compared with the other portions.

The first support plate 135 may be disposed to contact the first plate member 110, and the second support plate 136 may be disposed to contact the second plate member 120. Each of the first and second support plates 135 and 136 may be provided in a grid shape. Accordingly, the area of each of the first and second support plates 135 and 136 respectively contacting the first and second plate members 110 and 120 is decreased, thereby reducing a heat transfer amount.

Extending parts (or extension tabs) 112 for reinforcing the supporting ability of the first plate member 110 with the supporting unit 130 may be formed at the first plate member 110. The extending parts 112 may be formed to extend downward from an end portion of the first plate member 110.

Fixing parts (or fixing brackets) 137 and 138 may be formed at the second support plate 136. At least one portion of each of the fixing parts 137 and 138 may contact the extending part 112.

The extending part 112 may be provided in plurality, and the fixing parts 137 and 138 may be formed to correspond to the respective extending parts 112. The fixing parts 137 and 138 may include a first fixing part (or first fixing bracket) 137 contacting one surface of the extending part 112.

The first fixing part 137 may be formed to extend upward from the second support plate 136. Meanwhile, in these figures, the first fixing part 137 is disposed at the outside of the extending part 112. Alternatively, the first fixing part 137 may be provided at the inside of the extending part 112.

The fixing parts 137 and 138 may include a second fixing part (or second fixing bracket) 138 surrounding the extending part 112. The second fixing part 138 may be formed to extend upward from the second support plate 136. A groove into which the extending part 112 is inserted may be formed in the second support plate 136. Accordingly, the extending part 112 can be coupled to the second fixing part 138.

As shown in FIG. 13, the first fixing parts 137 may be arranged in a row at one side of the second support plate 136, and the second fixing parts 138 may be arranged in a row at another side of the second support plate 136. However, the present disclosure is not limited to the above-described arrangement.

The vacuum adiabatic body further includes a conductive resistance sheet 160 for preventing heat conduction between the first and second plate members 110 and 120. The conductive resistance sheet 160 may include sealing parts (or seals) 161 at which both ends of the conductive resistance sheet 160 are sealed so as to define at least one portion of a wall for the vacuum space part 150 and to maintain the vacuum state. The conductive resistance sheet 160 may be provided as a thin foil in unit of micrometers so as to reduce the amount of heat conduction flowing along the wall for the vacuum space part 150.

A side frame 170 may be provided at an outside of the conductive resistance sheet 160. One side of the conductive resistance sheet 160 may be fastened to the first plate member 110, and the other side of the conductive resistance sheet 160 may be fastened to the side frame 170.

A plurality of bars 131 for maintaining a distance between the side frame 170 and the second plate member 120 may be interposed between the side frame 170 and the second plate member 120. The shortest distance between a bar disposed at an outermost portion and a plurality of bars interposed between the side frame 170 and the second plate members 120 among the plurality of bars 131 interposed between the first and second plate members 110 and 120 is shorter than a pitch between the plurality of bars 131 interposed between the first and second plate members 110 and 120. This is for the purpose to prevent deformation of the side frame 170.

Welding parts as the sealing parts 161 may be formed at the conductive resistance sheet 160. Specifically, both the sides of the conductive resistance sheet 160 may be respectively mounted on the first plate member 110 and the side frame 170 and then welded.

FIG. 16 is a view showing the supporting unit and the radiation resistance sheet of FIG. 13. FIG. 17 is a plan view of FIG. 16. Referring to FIGS. 16 and 17, the supporting unit 130 may be mounted on the second plate member 120. The supporting unit 130 may include a plurality of radiation resistance sheets 132, 133, and 134.

The plurality of radiation resistance sheets 132, 133, and 134 may be penetrated by a plurality of bars 131. The radiation resistance sheets 132, 133, and 134 may be disposed to be spaced apart from each other by a separate spacing member.

First and second fixing parts 137 and 138 protruding upward are provided to the second support plate 136. The plurality of radiation resistance sheets 132, 133, and 134 are disposed over a range as wide as possible within the vacuum space part 150, which is effective in terms of adiabatic performance. However, if the first and second fixing parts 137 and 138 contact the plurality of radiation resistance sheets 132, 133, and 134, the adiabatic performance may be degraded by heat transfer.

Therefore, the first and second fixing parts 137 and 138 are to be disposed so as not to contact the plurality of radiation resistance sheets 132, 133, and 134. Thus, a depression part (or notch) 132a in which the first fixing part 13 can be accommodated is formed in a first radiation resistance sheet 132. A depression part 132b in which the second fixing part 138 can be accommodated is formed in the first radiation resistance sheet 132. Accordingly, the first and second fixing parts 137 and 138 cannot contact the first radiation resistance sheet. Depression parts in which the first and second fixing parts 137 and 138 are accommodated may also be formed in second and third radiation resistance sheets 133 and 134.

FIG. 18 is a view showing a vacuum adiabatic body according to a fourth embodiment. FIG. 19 is a view showing a first plate member of FIG. 18.

Referring to FIGS. 18 and 19, unlike the aforementioned embodiment, the vacuum adiabatic body of this embodiment is not provided with any fixing part, and includes an extending part having a different shape.

The vacuum adiabatic body of this embodiment includes a first plate member (or first plate) 210 and a second plate member (or second plate) 220. A first support plate 235 contacts the first plate member 210, and a second support plate 236 contacts the second plate member 220. At least one bar 231 may be interposed between the first and second support plates 235 and 236.

At least one radiation resistance sheet 232 may be provided between the first and second support plates 235 and 236. The radiation resistance sheet 232 may be penetrated by the at least one bar 231. An extending part (or extension bracket) 212 extending downward may be provided to the first plate member 210. The extending part 212 may be provided in plurality.

The extending part 212 may contact a side of the first support plate 235. As the extending part 212 is provided in plurality, the first plate member 210 may be fixed to the first support plate 235. In these figures, it can be seen that the first support plate 235 is inserted into the first plate member 210 through the extending part 212.

A lower end portion of the extending part 212 may be located above the radiation resistance sheet 232 such that the extending part 212 does not contact the radiation resistance sheet 232. The extending part 212 may be integrally formed with the first plate member 210. However, the present disclosure is not limited thereto, and the extending part 212 and the first plate member 210 may be provided as separate components from each other.

FIG. 20 is a view showing a vacuum adiabatic body according to a fifth embodiment. Referring to FIG. 20, the vacuum adiabatic body of this embodiment is different from that of the aforementioned embodiment in only the shape of an extending part.

Specifically, the vacuum adiabatic body of this embodiment includes an extending part (or extension bracket) 312 extending downward from an edge portion of a first plate member 310. A first support plate 335 contacts a lower end of the first plate member (or first plate) 310, and the extending part 312 may be provided to contact the first support plate 335.

The extending part 312 may be provided to extend downward from the entire edge portion of the first plate member 310. That is, the extending part 312 may be formed longer than the extending part 212 of the aforementioned embodiment. In this case, only one extending part 312 is provided at one corner of the first plate member 310.

The extending part 312 may be integrally formed with the first plate member 310. However, the present disclosure is not limited thereto, and the extending part 312 and the first plate member 310 may be provided as separate components from each other.

The extending part 312 may extend downward within a length range where it does not contact a radiation resistance sheet. Accordingly, the first plate member 310 can be supported by being fixed to the first support plate 335.

FIG. 21 is a view showing a vacuum adiabatic body according to a sixth embodiment. FIG. 22 is a longitudinal sectional view of FIG. 21.

Referring to FIGS. 21 and 22, in the vacuum adiabatic body of this embodiment, an extending part may be formed to protrude downward from a surface of a plate member instead of an edge portion of the plate member.

The vacuum adiabatic body of this embodiment includes a first plate member (or first plate) 410, a first support plate 435 contacting a lower portion of the first plate member 410, and at least one bar 431 supporting the first support plate 435. The at least one bar 431 may be between the first support plate 435 and a second support plate 436.

An extending part (or recess) 412 protruding toward the first support plate 435 may be formed in the first plate member 410. Unlike the extending part of the aforementioned embodiment, the extending part 412 is formed to protrude downward from any one place of the first plate member 410 instead of an edge portion of the first plate member 410.

The extending part 412 may be formed in the planar first plate member 410 using a forming mold. The extending part 412 may be formed to protrude in a shape corresponding to a groove provided in the first support plate 435. Thus, the extending part 412 can be inserted into the groove provided in the first support plate 435.

Accordingly, the first support plate 435 can be supported by being fixed to the first support plate 435. Meanwhile, in the present disclosure, it has been described that the first plate member is fixed to the supporting unit. However, instead of the first plate member, the second plate member may be fixed to the supporting unit.

FIG. 23 is a view showing a vacuum adiabatic body according to a seventh embodiment. Referring to FIG. 23, the vacuum adiabatic body according to the seventh embodiment includes a first plate member (or first plate) 1110, a second plate member (or second plate) 1120, and a supporting unit (or support) 1130. The supporting unit 1130 includes a first support plate 1135, a second support plate 1136, at least one bar 1131, and a radiation resistance sheet 1132.

The first support plate 1135 may contact the first plate member 1110, and the second support plate 1136 may contact the second plate member 1120. Here, each of the first plate member 1110, the second plate member 1120, the first support plate 1135, the second support plate 1136, and the radiation resistance sheet 1132 is formed as a curved surface, and has a larger curvature as it is more distant from the center of curvature.

FIG. 24 is a view showing the supporting unit of FIG. 23. FIG. 25 is an exploded view of the supporting unit of FIG. 23. Referring to FIGS. 24 and 25, the supporting unit 1130 includes a first support plate 1135, a second support plate 1136, and a plurality of bars 1131.

The supporting unit 1130 may be formed into a structure in which the plurality of bars 1131 are fixed to the second support plate 1136, and the first support plate 1135 is attachable/detachable to/from the other ends of the plurality of bars 1131. Therefore, an assembly of the second support plate 1136 and the plurality of bars 1131 may be referred to as a "base," and the first support plate 1135 may be referred to as a "cover."

The first support plate 1135 may be provided with a plurality of insertion parts or holes 1137 into which the respective bars 1131 are inserted. A pitch between the plurality of insertion parts 1137 has a small value as compared with that between the plurality of bars 1131 attached to the second support plate 1136.

A distance R1 from the center of curvature to the first support plate 1135, a distance R2 from the center of curvature to the radiation resistance sheet 1132, and a distance R3 from the center of curvature to the second support plate 1136 are sequentially increased. Pitches P1, P2, and P3 between the plurality of bars 1131 are sequentially increased as they are distant from the center of curvature. Here, P1 refers to a pitch between the plurality of insertion parts 1137 provided in the first support plate 1135, P2 refers to a pitch between through-holes provided in the radiation resistance sheet 1132, and P3 refers to a pitch between spots at which the second support plate 1136 and the plurality of bars 1131 are connected to each other.

FIG. 26 is a view showing a case where a plurality of radiation resistance sheets is provided in the supporting unit of FIG. 23. Referring to FIG. 26, a plurality of radiation resistance sheets 1132, 1133, and 1134 may be provided between the first and second support plates 1135 and 1136. A first radiation resistance sheet 1132, a second radiation resistance sheet 1133, and a third radiation resistance sheet 1134 are sequentially disposed in a direction distant from the center of curvature.

A plurality of through-holes 1132a, 1133a, and 1134a penetrated by the bars 1131 may be formed in the radiation resistance sheets 1132, 1133, and 1134, respectively.

Pitches between the plurality of through-holes 1132a, 1133a, and 1134a may be sequentially increased as they are distant from the center of curvature.

End portions of the plurality of radiation resistance sheets 1132, 1133, and 1134 may be lengthened as they are distant from the center of curvature. This can be considered in the same context as that the pitches between the plurality of through-holes 1132a, 1133a, and 1134a are increased.

FIG. 27 is a view showing the supporting unit of FIG. 23, viewed from the top. FIG. 28 is a view showing a side of the supporting unit of FIG. 23. FIG. 29 is a view showing an edge portion of a support plate of FIG. 23.

Referring to FIGS. 27 to 29, the second support plate 1136 includes a plurality of connection ribs 1136a and 1136b forming grid shapes. In FIG. 27, the plurality of connection ribs 1136a and 1136b include a plurality of first connection ribs 1136a extending in the horizontal or first direction and a plurality of second connection ribs 1136b extending in the vertical or second direction.

The plurality of first connection ribs 1136a are formed to extend along the circumferential direction of the second support plate 1136 forming a curved surface, and the plurality of second connection ribs 1136b are formed to extend along the direction of the center of curvature of the second support plate 1136. That is, the plurality of first connection ribs 1136a are curved such that each of the plurality of first connection ribs 1136a forms a curve, and each of the plurality of second connection ribs 1136b forms a straight line.

Each of the plurality of first connection ribs 1136a may be formed thinner than each of the plurality of second connection ribs 1136b. This is for the purpose that each of the plurality of first connection ribs 1136a is well warped to form a curve. In this case, each of the plurality of second connection ribs 1136b may be formed thicker than each of the plurality of first connection ribs 1136a, thereby reinforcing its strength.

For example, the thickness of each of the plurality of first connection ribs 1136a may be formed to be equal to or greater than 1 mm and equal to or smaller than 3 mm. Like the second support plate 1136, a plurality of first connection ribs and a plurality of second connection ribs may also be provided in the first support plate 1135. Bars 1131 may be respectively provided at spots at which the first and second connection ribs 1136a and 1136b.

A plurality of connection parts (or connection bases) 1138 may be formed at portions at which the respective bars 1131 and the second support plate 1136 meet. A pitch between the plurality of connection parts 1138 may be formed larger than that between the plurality of insertion parts 1137. This is because the plurality of connection parts 1138 is disposed more distant from the center of curvature than the plurality of insertion parts 1137.

However, the plurality of connection parts 1138 are provided to the first support plate 1135, and the plurality of insertion parts 1137 are provided in the second support plate 1136, a pitch between the plurality of connection parts 1138 may be formed smaller than that between the plurality of insertion parts 1137. This is because the plurality of connection parts 1138 is disposed closer to the center of curvature than the plurality of insertion parts 1137.

Each of the plurality of connection parts 1138 may be formed to be rounded. Accordingly, it is possible to reduce damage caused by a front end in machining or assembling of the second support plate 1136. A round size R may be approximately 0.05 mm to 1 mm.

A third connection rib 1139 formed at the edge portion of the second support plate 1136 is formed thicker than the first and second connection ribs 1136a and 1136b. For example, the third connection rib 1139 may be formed thicker by about 0.2 mm than the first and second connection ribs 1136a and 1136b.

Also, the third connection rib 1139 may be made of a material having a larger density than the first and second connection ribs 1136a and 1136b. This is for the purpose to complement strength because the edge portion of the second support plate 1136 may be weak in terms of strength. Accordingly, it is possible to prevent damage of the second support plate 1136.

According to the present disclosure, the vacuum adiabatic body can be industrially applied to various adiabatic apparatuses. The adiabatic effect can be enhanced, so that it is possible to improve energy use efficiency and to increase the effective volume of an apparatus.

The invention claimed is:

1. A vacuum adiabatic body comprising:
a first plate defining at least one portion of a first side of a wall adjacent to a first space having a first temperature;
a second plate defining at least one portion of a second side of the wall adjacent to a second space having a second temperature different from the first temperature;
a seal that seals the first plate and the second plate to provide a third space that has a third temperature between the first temperature and the second temperature and is in a vacuum state;
a support that supports the first and second plates and is provided in the third space; and
an exhaust port through which a gas in the third space is exhausted,
wherein the first plate includes an extension tab that extends into the third space to be coupled to the support such that the coupling of the extension tab and the support reinforces the supporting ability of the first plate with the support, and
the extension tab extends downward from an edge of the first plate.

2. The vacuum adiabatic body according to claim 1, further including a conductive resistance sheet connected to at least one of the first and second plates.

3. The vacuum adiabatic body according to claim 2, wherein the support includes a fixing bracket contacting at least one surface of the extension tab to support the first plate.

4. The vacuum adiabatic body according to claim 2, wherein the support includes a fixing bracket surrounding the extension tab to support the first plate.

5. The vacuum adiabatic body according to claim 3, further including at least one radiation resistance sheet formed in a plate shape provided in the third space, wherein the radiation resistance sheet includes
a notch corresponding to the fixing bracket.

6. The vacuum adiabatic body according to claim 1, wherein the support includes a support plate extending in a direction parallel to the first plate, the support plate being coupled to the extension tab.

7. The vacuum adiabatic body according to claim 6, wherein the extension tab covers an edge of the support plate.

8. The vacuum adiabatic body according to claim 1, further including a radiation resistance sheet that limits radiation heat transfer between the first and second plates,
wherein the radiation resistance sheet is provided in a plate shape inside the third space, and
a bottom end of the extension tab is spaced apart from the radiation resistance sheet.

9. A refrigerator comprising:
a main body including an internal space in which goods are stored; and
a door provided to open and close the main body,
wherein at least one of the main body and the door includes the vacuum adiabatic body of claim 1.

10. A refrigerator comprising:
a main body including an internal space in which goods are stored; and
a door provided to open and close the main body,
wherein, in order to supply a refrigerant into the main body, the refrigerator includes:
a compressor that compresses the refrigerant;
a condenser that condenses the compressed refrigerant;
an expander that expands the condensed refrigerant; and
an evaporator that evaporates the expanded refrigerant to transfer heat,
wherein at least one of the main body and the door includes a vacuum adiabatic body,
wherein the vacuum adiabatic body includes:
a first plate defining at least one portion of a first side of a wall adjacent to the internal space having a first temperature;
a second plate defining at least one portion of a second side of the wall adjacent to an external space having a second temperature different from the first temperature;
a seal that seals the first plate and the second plate to provide a vacuum space that has a third temperature between the first temperature and the second temperature and is in a vacuum state;
a support that supports the first and second plates and is provided in the vacuum space; and
an exhaust port through which a gas in the vacuum space is exhausted,
wherein the first plate is provided with an extension tab that extends toward the vacuum space, the extension tab being coupled to the support such that the coupling of the extension tab and the support reinforces the supporting ability of the first plate with the support, and the extension tab extends downward from an edge of the first plate.

* * * * *